(12) United States Patent
Paknad

(10) Patent No.: US 9,830,563 B2
(45) Date of Patent: Nov. 28, 2017

(54) SYSTEM AND METHOD FOR MANAGING LEGAL OBLIGATIONS FOR DATA

(75) Inventor: Deidre Paknad, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 1619 days.

(21) Appl. No.: 12/215,866

(22) Filed: Jun. 27, 2008

(65) Prior Publication Data

US 2009/0327021 A1 Dec. 31, 2009

(51) Int. Cl.
| | |
|---|---|
| *G06Q 30/02* | (2012.01) |
| *G06Q 10/10* | (2012.01) |
| *G06Q 10/06* | (2012.01) |
| *G06Q 30/06* | (2012.01) |
| *G06Q 10/08* | (2012.01) |
| *G06Q 50/18* | (2012.01) |

(52) U.S. Cl.
CPC ......... *G06Q 10/06* (2013.01); *G06Q 10/0633* (2013.01); *G06Q 10/10* (2013.01); *G06Q 50/18* (2013.01); *G06Q 10/105* (2013.01); *G06Q 50/184* (2013.01)

(58) Field of Classification Search
CPC .... G06Q 10/105; G06Q 50/184; G06Q 10/06; G06Q 10/0633; G06Q 10/10; G06Q 50/18
USPC .............................................. 705/1, 1.1–920
See application file for complete search history.

(56) References Cited

U.S. PATENT DOCUMENTS

| | | | |
|---|---|---|---|
| 5,313,609 A | 5/1994 | Baylor et al. | |
| 5,355,497 A | 10/1994 | Cohen-Levy | |
| 5,608,865 A | 3/1997 | Midgely et al. | |
| 5,701,472 A | 12/1997 | Koerber et al. | |
| 5,875,431 A | 2/1999 | Heckman et al. | |
| 5,903,879 A * | 5/1999 | Mitchell | 705/36 R |
| 5,963,964 A | 10/1999 | Nielsen | |
| 6,049,812 A | 4/2000 | Bertram et al. | |
| 6,115,642 A * | 9/2000 | Brown et al. | 700/104 |
| 6,128,620 A * | 10/2000 | Pissanos et al. | 705/2 |
| 6,151,031 A | 11/2000 | Atkins et al. | |
| 6,173,270 B1 * | 1/2001 | Cristofich et al. | 705/37 |
| 6,330,572 B1 | 12/2001 | Sitka | |

(Continued)

FOREIGN PATENT DOCUMENTS

| | | |
|---|---|---|
| EP | 2110781 A1 | 10/2009 |
| WO | 2004092902 A2 | 10/2004 |

OTHER PUBLICATIONS www.pss-systems.com retrieved from www.archive.org any linkage Dec. 5, 2008.*

(Continued)

*Primary Examiner* — Jonathan Ouellette
(74) *Attorney, Agent, or Firm* — Shumaker & Sieffert, P.A.

(57) ABSTRACT

Systems and methods for managing legal obligations for data are provided. In exemplary embodiments, an information portal is established which provides a visual interface of legal obligations and workflow required to be administered by IT personnel. At least one legal obligation may be determined. Based on the legal obligation, workflow for performing the legal obligations is generated for IT personnel. The workflow may comprise instructions to personnel responsible for data management of one or more affected systems containing the data. The instructions are then provided via the information portal.

22 Claims, 10 Drawing Sheets

(56) References Cited

U.S. PATENT DOCUMENTS

| | | | |
|---|---|---|---|
| 6,332,125 B1* | 12/2001 | Callen et al. | 705/4 |
| 6,343,287 B1* | 1/2002 | Kumar et al. | |
| 6,401,079 B1* | 6/2002 | Kahn et al. | 705/30 |
| 6,425,764 B1 | 7/2002 | Lamson | |
| 6,460,060 B1 | 10/2002 | Maddalozzo, Jr. et al. | |
| 6,538,623 B1 | 3/2003 | Parisian | G06F 1/163 |
| 6,539,379 B1* | 3/2003 | Vora et al. | |
| 6,553,365 B1 | 4/2003 | Summerlin et al. | |
| 6,607,389 B2 | 8/2003 | Genevie | |
| 6,622,128 B1* | 9/2003 | Bedell et al. | 705/30 |
| 6,738,760 B1* | 5/2004 | Krachman | |
| 6,805,351 B2 | 10/2004 | Nelson | |
| 6,832,205 B1 | 12/2004 | Aragones et al. | |
| 6,839,682 B1 | 1/2005 | Blume et al. | |
| 6,944,597 B2* | 9/2005 | Callen et al. | 705/4 |
| 6,966,053 B2 | 11/2005 | Paris et al. | |
| 6,976,083 B1 | 12/2005 | Baskey et al. | |
| 6,981,210 B2 | 12/2005 | Peters et al. | |
| 7,016,919 B2 | 3/2006 | Cotton et al. | |
| 7,076,439 B1 | 7/2006 | Jaggi | |
| 7,082,573 B2 | 7/2006 | Apparao et al. | |
| 7,103,601 B2 | 9/2006 | Black et al. | |
| 7,103,602 B2 | 9/2006 | Black et al. | |
| 7,104,416 B2 | 9/2006 | Gasco et al. | |
| 7,107,416 B2 | 9/2006 | Stuart et al. | |
| 7,120,914 B1 | 10/2006 | Manthos et al. | |
| 7,127,470 B2 | 10/2006 | Takeya | |
| 7,146,388 B2 | 12/2006 | Stakutis et al. | |
| 7,162,427 B1 | 1/2007 | Myrick et al. | |
| 7,197,716 B2* | 3/2007 | Newell et al. | 715/760 |
| 7,206,789 B2 | 4/2007 | Hurmiz et al. | |
| 7,225,249 B1 | 5/2007 | Barry et al. | |
| 7,233,959 B2 | 6/2007 | Kanellos et al. | |
| 7,236,953 B1 | 6/2007 | Cooper et al. | |
| 7,240,296 B1 | 7/2007 | Matthews et al. | |
| 7,249,315 B2 | 7/2007 | Moetteli | |
| 7,281,084 B1 | 10/2007 | Todd et al. | |
| 7,283,985 B2 | 10/2007 | Schauerte et al. | |
| 7,284,985 B2 | 10/2007 | Genevie | |
| 7,292,965 B1 | 11/2007 | Mehta et al. | |
| 7,333,989 B1 | 2/2008 | Sameshima et al. | |
| 7,386,468 B2* | 6/2008 | Calderaro et al. | 705/7.13 |
| 7,433,832 B1 | 10/2008 | Bezos et al. | |
| 7,451,155 B2 | 11/2008 | Slackman et al. | |
| 7,478,096 B2 | 1/2009 | Margolus et al. | |
| 7,496,534 B2 | 2/2009 | Olsen et al. | |
| 7,502,891 B2 | 3/2009 | Shachor | |
| 7,512,636 B2 | 3/2009 | Verma et al. | |
| 7,558,853 B2 | 7/2009 | Alcorn et al. | |
| 7,580,961 B2 | 8/2009 | Todd et al. | |
| 7,594,082 B1 | 9/2009 | Kilday et al. | |
| 7,596,541 B2 | 9/2009 | deVries et al. | |
| 7,600,086 B2 | 10/2009 | Hochberg et al. | |
| 7,614,004 B2 | 11/2009 | Milic-Frayling et al. | |
| 7,617,458 B1 | 11/2009 | Wassom, Jr. et al. | |
| 7,636,886 B2 | 12/2009 | Wyle et al. | |
| 7,653,893 B2 | 1/2010 | Neumaan et al. | |
| 7,720,825 B2 | 5/2010 | Pelletier et al. | |
| 7,730,113 B1 | 6/2010 | Payette et al. | |
| 7,730,148 B1 | 6/2010 | Mace et al. | |
| 7,742,940 B1 | 6/2010 | Shan et al. | |
| 7,774,721 B2 | 8/2010 | Milic-Frayling et al. | |
| 7,778,976 B2 | 8/2010 | D'Souza et al. | |
| 7,792,945 B2 | 9/2010 | Paknad et al. | |
| 7,861,166 B1 | 12/2010 | Hendricks | |
| 7,865,817 B2 | 1/2011 | Ryan et al. | |
| 7,895,229 B1* | 2/2011 | Paknad | 707/769 |
| 7,912,804 B1 | 3/2011 | Talwar et al. | |
| 7,962,843 B2 | 6/2011 | Milic-Frayling et al. | |
| 8,073,729 B2 | 12/2011 | Kisin et al. | |
| 8,131,719 B2 | 3/2012 | Paknad | |
| 8,140,494 B2 | 3/2012 | Raynaud-Richard et al. | |
| 8,200,690 B2 | 6/2012 | Paknad et al. | |
| 8,250,041 B2 | 8/2012 | Pogodin | |
| 8,275,720 B2 | 9/2012 | Islam et al. | |
| 8,327,384 B2 | 12/2012 | Paknad et al. | |
| 8,402,359 B1 | 3/2013 | Pogodin et al. | |
| 8,484,069 B2 | 7/2013 | Kisin et al. | |
| 8,489,439 B2 | 7/2013 | Kisin et al. | |
| 8,515,924 B2 | 8/2013 | Paknad et al. | |
| 8,566,903 B2 | 10/2013 | Kisin et al. | |
| 8,572,043 B2 | 10/2013 | Pogodin | |
| 8,626,727 B2 | 1/2014 | Paknad | |
| 8,700,581 B2 | 4/2014 | Paknad | |
| 8,832,148 B2 | 9/2014 | Kisin et al. | |
| 2001/0053967 A1 | 12/2001 | Gordon et al. | |
| 2002/0007333 A1* | 1/2002 | Scolnik et al. | 705/37 |
| 2002/0010708 A1 | 1/2002 | McIntosh | |
| 2002/0022982 A1* | 2/2002 | Cooperstone et al. | 705/7 |
| 2002/0035480 A1 | 3/2002 | Gordon et al. | |
| 2002/0083090 A1 | 6/2002 | Jeffrey et al. | |
| 2002/0091553 A1 | 7/2002 | Callen et al. | |
| 2002/0091836 A1 | 7/2002 | Moetteli | |
| 2002/0095416 A1 | 7/2002 | Schwols | |
| 2002/0103680 A1* | 8/2002 | Newman | 705/4 |
| 2002/0108104 A1 | 8/2002 | Song et al. | |
| 2002/0119433 A1 | 8/2002 | Callender | |
| 2002/0120859 A1 | 8/2002 | Lipkin et al. | |
| 2002/0123902 A1 | 9/2002 | Lenore et al. | |
| 2002/0138322 A1 | 9/2002 | Umezawa et al. | |
| 2002/0143595 A1* | 10/2002 | Frank et al. | 705/8 |
| 2002/0143735 A1 | 10/2002 | Ayi et al. | |
| 2002/0147801 A1 | 10/2002 | Gullotta et al. | |
| 2002/0162053 A1 | 10/2002 | Os | |
| 2002/0178138 A1 | 11/2002 | Ender et al. | |
| 2002/0184068 A1* | 12/2002 | Krishnan et al. | 705/8 |
| 2002/0184148 A1* | 12/2002 | Kahn et al. | 705/40 |
| 2003/0004985 A1 | 1/2003 | Kagimasa et al. | |
| 2003/0014386 A1* | 1/2003 | Jurado, Jr. | 707/1 |
| 2003/0018520 A1 | 1/2003 | Rosenfeld et al. | |
| 2003/0018663 A1 | 1/2003 | Cornette et al. | |
| 2003/0031991 A1 | 2/2003 | Genevie | |
| 2003/0033295 A1 | 2/2003 | Adler et al. | |
| 2003/0036994 A1 | 2/2003 | Wilzig et al. | |
| 2003/0046287 A1* | 3/2003 | Joe | 707/10 |
| 2003/0051144 A1* | 3/2003 | Williams | 713/178 |
| 2003/0069839 A1* | 4/2003 | Whittington et al. | 705/38 |
| 2003/0074354 A1 | 4/2003 | Lee et al. | |
| 2003/0097342 A1* | 5/2003 | Whittingtom | 705/75 |
| 2003/0110228 A1* | 6/2003 | Xu et al. | 709/207 |
| 2003/0139827 A1 | 7/2003 | Phelps | |
| 2003/0144897 A1 | 7/2003 | Burruss et al. | |
| 2003/0208689 A1 | 11/2003 | Garza | |
| 2003/0229522 A1* | 12/2003 | Thompson et al. | 705/4 |
| 2004/0002044 A1 | 1/2004 | Genevie | |
| 2004/0003351 A1 | 1/2004 | Sommerer et al. | |
| 2004/0019496 A1 | 1/2004 | Angle et al. | |
| 2004/0034659 A1* | 2/2004 | Steger | 707/104.1 |
| 2004/0039933 A1 | 2/2004 | Martin et al. | |
| 2004/0060063 A1 | 3/2004 | Russ et al. | |
| 2004/0068432 A1* | 4/2004 | Meyerkopf et al. | 705/11 |
| 2004/0078368 A1 | 4/2004 | Excoffier et al. | |
| 2004/0088211 A1 | 5/2004 | Kakouros et al. | |
| 2004/0088283 A1 | 5/2004 | Lissar et al. | |
| 2004/0088332 A1 | 5/2004 | Lee et al. | |
| 2004/0088729 A1 | 5/2004 | Petrovic et al. | |
| 2004/0103284 A1 | 5/2004 | Barker | |
| 2004/0133573 A1 | 7/2004 | Miloushev et al. | |
| 2004/0133849 A1 | 7/2004 | Goger | |
| 2004/0138903 A1* | 7/2004 | Zuniga | 705/1 |
| 2004/0143444 A1 | 7/2004 | Opsitnick et al. | |
| 2004/0187164 A1 | 9/2004 | Kandasamy et al. | |
| 2004/0193703 A1* | 9/2004 | Loewy et al. | 709/220 |
| 2004/0204947 A1* | 10/2004 | Li et al. | 705/1 |
| 2004/0215169 A1 | 10/2004 | Rabold | |
| 2004/0215619 A1 | 10/2004 | Rabold | |
| 2004/0216039 A1 | 10/2004 | Lane et al. | |
| 2004/0260569 A1* | 12/2004 | Bell et al. | 705/1 |
| 2005/0060175 A1 | 3/2005 | Farber et al. | |
| 2005/0071251 A1 | 3/2005 | Linden et al. | |
| 2005/0071284 A1 | 3/2005 | Courson et al. | |
| 2005/0074734 A1 | 4/2005 | Randhawa | |
| 2005/0091076 A1 | 4/2005 | McGovern | |
| 2005/0114241 A1* | 5/2005 | Hirsch et al. | 705/35 |

(56) References Cited

U.S. PATENT DOCUMENTS

| | | |
|---|---|---|
| 2005/0125282 A1 | 6/2005 | Rosen |
| 2005/0144114 A1 | 6/2005 | Ruggieri et al. |
| 2005/0149307 A1 | 7/2005 | Gurpinar et al. |
| 2005/0160361 A1 | 7/2005 | Young |
| 2005/0165734 A1 | 7/2005 | Vicars et al. |
| 2005/0187813 A1 | 8/2005 | Genevie |
| 2005/0203821 A1* | 9/2005 | Petersen et al. ............... 705/36 |
| 2005/0203931 A1 | 9/2005 | Pingree et al. |
| 2005/0240578 A1 | 10/2005 | Biederman, Sr. et al. |
| 2005/0246451 A1 | 11/2005 | Silverman et al. |
| 2005/0283346 A1 | 12/2005 | Elkins, II et al. |
| 2006/0036464 A1 | 2/2006 | Cahoy et al. |
| 2006/0036649 A1 | 2/2006 | Simske et al. |
| 2006/0074793 A1 | 4/2006 | Hibbert et al. |
| 2006/0095421 A1 | 5/2006 | Nagai et al. |
| 2006/0095687 A1 | 5/2006 | Hsu et al. |
| 2006/0126657 A1 | 6/2006 | Beisiegel et al. |
| 2006/0136435 A1 | 6/2006 | Nguyen et al. |
| 2006/0143248 A1 | 6/2006 | Nakano et al. |
| 2006/0143464 A1 | 6/2006 | Ananthanarayanan et al. |
| 2006/0149407 A1 | 7/2006 | Markham et al. |
| 2006/0149712 A1 | 7/2006 | Kindsvogel et al. |
| 2006/0149735 A1 | 7/2006 | DeBie et al. |
| 2006/0149831 A1 | 7/2006 | Dutta et al. |
| 2006/0156381 A1 | 7/2006 | Motoyama |
| 2006/0156382 A1 | 7/2006 | Motoyama |
| 2006/0167704 A1 | 7/2006 | Nicholls et al. |
| 2006/0174320 A1 | 8/2006 | Maru et al. |
| 2006/0178917 A1 | 8/2006 | Merriam et al. |
| 2006/0184718 A1 | 8/2006 | Sinclair |
| 2006/0195430 A1 | 8/2006 | Arumainayagam et al. |
| 2006/0229999 A1 | 10/2006 | Dodell et al. |
| 2006/0230044 A1 | 10/2006 | Utiger |
| 2006/0235899 A1 | 10/2006 | Tucker |
| 2006/0242001 A1 | 10/2006 | Heathfield |
| 2007/0016546 A1 | 1/2007 | De Vorchik et al. |
| 2007/0048720 A1 | 3/2007 | Billauer |
| 2007/0061156 A1 | 3/2007 | Fry et al. |
| 2007/0061157 A1 | 3/2007 | Fry et al. |
| 2007/0061421 A1 | 3/2007 | Karidi |
| 2007/0066115 A1 | 3/2007 | Saito et al. |
| 2007/0073748 A1 | 3/2007 | Barney |
| 2007/0078900 A1 | 4/2007 | Donahue |
| 2007/0099162 A1 | 5/2007 | Sekhar |
| 2007/0100857 A1 | 5/2007 | DeGrande et al. |
| 2007/0112783 A1 | 5/2007 | McCreight et al. |
| 2007/0118556 A1 | 5/2007 | Arnold et al. |
| 2007/0156418 A1* | 7/2007 | Richter et al. ................... 705/1 |
| 2007/0162417 A1 | 7/2007 | Cozianu et al. |
| 2007/0179829 A1 | 8/2007 | Laperi et al. |
| 2007/0179939 A1 | 8/2007 | O'Neil et al. |
| 2007/0203810 A1 | 8/2007 | Grichnik |
| 2007/0208690 A1 | 9/2007 | Schneider et al. |
| 2007/0219844 A1 | 9/2007 | Santorine et al. |
| 2007/0220435 A1 | 9/2007 | Sriprakash et al. |
| 2007/0245013 A1 | 10/2007 | Saraswathy et al. |
| 2007/0271230 A1 | 11/2007 | Hart et al. |
| 2007/0271308 A1 | 11/2007 | Bentley et al. |
| 2007/0271517 A1* | 11/2007 | Finkelman et al. .......... 715/742 |
| 2007/0282652 A1 | 12/2007 | Childress et al. |
| 2007/0288659 A1 | 12/2007 | Zakarian et al. |
| 2008/0033904 A1 | 2/2008 | Ghielmetti et al. |
| 2008/0034003 A1 | 2/2008 | Stakutis et al. |
| 2008/0059265 A1 | 3/2008 | Biazetti et al. |
| 2008/0059543 A1 | 3/2008 | Engel |
| 2008/0070206 A1 | 3/2008 | Perilli |
| 2008/0071561 A1 | 3/2008 | Holcombe |
| 2008/0086305 A1 | 4/2008 | Lewis et al. |
| 2008/0086506 A1 | 4/2008 | DeBie et al. |
| 2008/0091283 A1 | 4/2008 | Balci et al. |
| 2008/0126156 A1 | 5/2008 | Jain et al. |
| 2008/0147642 A1 | 6/2008 | Leffingwell et al. |
| 2008/0148193 A1 | 6/2008 | Moetteli |
| 2008/0148346 A1 | 6/2008 | Gill et al. |
| 2008/0154969 A1 | 6/2008 | DeBie |
| 2008/0154970 A1 | 6/2008 | DeBie |
| 2008/0177790 A1 | 7/2008 | Honwad |
| 2008/0195597 A1 | 8/2008 | Rosenfeld et al. |
| 2008/0209338 A1 | 8/2008 | Li |
| 2008/0229037 A1 | 9/2008 | Bunte et al. |
| 2008/0262898 A1 | 10/2008 | Tonchev et al. |
| 2008/0288479 A1 | 11/2008 | Paknad |
| 2008/0294492 A1 | 11/2008 | Simpson et al. |
| 2008/0294674 A1 | 11/2008 | Reztlaff, II et al. |
| 2008/0301207 A1 | 12/2008 | Demarest et al. |
| 2008/0312980 A1 | 12/2008 | Boulineau et al. |
| 2008/0319958 A1 | 12/2008 | Bhattacharya et al. |
| 2008/0319984 A1 | 12/2008 | Proscia et al. |
| 2009/0037376 A1 | 2/2009 | Archer et al. |
| 2009/0043625 A1 | 2/2009 | Yao |
| 2009/0064184 A1 | 3/2009 | Chacko et al. |
| 2009/0094228 A1 | 4/2009 | Bondurant et al. |
| 2009/0100021 A1 | 4/2009 | Morris et al. |
| 2009/0106815 A1 | 4/2009 | Brodie et al. |
| 2009/0119677 A1 | 5/2009 | Stefansson et al. |
| 2009/0132262 A1 | 5/2009 | Paknad |
| 2009/0150168 A1 | 6/2009 | Schmidt |
| 2009/0150866 A1 | 6/2009 | Schmidt |
| 2009/0150906 A1 | 6/2009 | Schmidt et al. |
| 2009/0157465 A1 | 6/2009 | Heathfield |
| 2009/0164790 A1 | 6/2009 | Pogodin |
| 2009/0165026 A1 | 6/2009 | Paknad et al. |
| 2009/0171961 A1 | 7/2009 | Fredrickson |
| 2009/0193210 A1 | 7/2009 | Hewett et al. |
| 2009/0241054 A1 | 9/2009 | Hendricks |
| 2009/0249179 A1 | 10/2009 | Shieh et al. |
| 2009/0249446 A1 | 10/2009 | Jenkins et al. |
| 2009/0254572 A1 | 10/2009 | Redlich et al. |
| 2009/0286219 A1 | 11/2009 | Kisin et al. |
| 2009/0287658 A1 | 11/2009 | Bennett |
| 2009/0307743 A1 | 12/2009 | Azagury et al. |
| 2010/0017239 A1 | 1/2010 | Saltzman et al. |
| 2010/0017756 A1 | 1/2010 | Wassom, Jr. et al. |
| 2010/0050064 A1 | 1/2010 | Liu et al. |
| 2010/0057418 A1 | 3/2010 | Li et al. |
| 2010/0070315 A1 | 3/2010 | Lu et al. |
| 2010/0082678 A1 | 4/2010 | Baier |
| 2010/0088583 A1 | 4/2010 | Schachter |
| 2010/0094766 A1 | 4/2010 | Li et al. |
| 2010/0205020 A1 | 8/2010 | Losey |
| 2010/0250455 A1 | 9/2010 | Richards et al. |
| 2010/0250531 A1 | 9/2010 | Andersen et al. |
| 2010/0250541 A1 | 9/2010 | Richards et al. |
| 2010/0250625 A1 | 9/2010 | Olenick et al. |
| 2010/0250644 A1 | 9/2010 | Toomey et al. |
| 2010/0251109 A1 | 9/2010 | Jin et al. |
| 2011/0040600 A1 | 2/2011 | Paknad et al. |
| 2011/0040748 A1 | 2/2011 | Williams et al. |
| 2011/0106773 A1 | 5/2011 | Smith et al. |
| 2011/0153579 A1 | 6/2011 | Paknad et al. |
| 2011/0173033 A1 | 7/2011 | Paknad |
| 2011/0191344 A1 | 8/2011 | Jin et al. |
| 2011/0320480 A1 | 12/2011 | Kisin et al. |
| 2013/0091175 A1 | 4/2013 | Richards et al. |
| 2014/0379764 A1 | 12/2014 | Kisin et al. |

OTHER PUBLICATIONS www.pss-systems.com retrieved from archive.org any linkage Jan. 3, 2007. Referred to as PSS-Appendix.*

Zhu et al., "Query Expansion Using Web Access Log Files," Lecture Notes in Computer Science, 2005, vol. 3588/2005, pp. 686-695, Springer-Verlag Berlin Heidelberg, 2005.

"mySAAP ERP Human Capital Management: Maximizing Workforce Potential", <a href="http://web.archive.org/web/20060823140053/www.sap.com/solutions/businesss-suite/erp/hcm/index.exp"?http://web.archive.org.web/2006 . . . </a>.

www.pss-systems.com retrieved from www.archive.org Dec. 8, 2005.

"Atlas LCC is a Strategic Investment," PSS Systems, retrieved from the internet on Jun. 5, 2014 from https://web.archive.org/web/20060313013159/http://www.pss-systems.com/solutions/strategicinvestment.html, Mar. 13, 2006, 2 pp.

(56) References Cited

OTHER PUBLICATIONS

"Atlas Litigation Communications & Collections Software, Index," PSS Systems, retrieved from the internet on Jun. 5, 2014 from hllps:l/web.archive.org/web/20060313012427/hllp:l/www.pss-systems.com/index.html, Mar. 12, 2006, 2pp.

"Data Classification and Handling," PSS Systems, retrieved from the internet on Jun. 5, 2014 from https://web.archive.org/web/20051125040616/http://www.pss-systems.com/solutions/classification.html,Nov. 25, 2005, 2 pp.

"Atlas Enterprise Retention Policy Management," PSS Systems, retrieved from the internet on Jun. 5, 2014 from https://web.archive.org/web/20060313012317/http://www.pss-systems.com/solutions/erm.html, Mar. 13, 2006, 2 pp.

"Atlas Enterprise Retention Management," PSS Systems, retrieved from the internet on Jun. 5, 2014 from https://web.archive.org/web/20051126015829/http://www.pss-systems.com/solutions/erm.html, Nov. 26, 2005, 2 pp.

"Microsoft Computer Dictionary", Microsoft Press, Fifth Edition, 2002, pg. 499.

Abecker et al., "Business-process oriented delivery of knowledge through domain ontologies", Proceedings of the 12th international workshop on Database and Expert Systems Applications, pp. 442-446, 2001, IEEE.

Cohasset Associate, Inc. "Compliance Requirements Assessment, IBM DB2 Records Manager and Record-Enabled Solutions", Oct. 31, 2004, Chicago, IL, 54 pp.

Fujita et al., "Proposal and Evaluation and Metadata Management Method for eDiscovery," 2012 Service Research and Innovation Institute Global Conference, Jul. 24-Jul. 27, 2012, 9 pp.

Jisc infoNet. HEI Records Management: Guidance on Developing a File Plan. Jan 1, 2007, 7 pp.

Joshi et al., "Improving the Efficiency of Legal E-Discovery Services using Text Mining Technologies," 2011 Annual SRII Global Conference, Mar. 29-Apr. 2, 2011, 8 pp.

Lewis, "Where Data Resides—Data Discovery from the Inside Out," retrieved from http://digitalmountain.com/fullaccess/Article6.Qdf on Mar. 13, 2012, Digital Mountain, Inc., 2004, 5 pp.

PSS Systems, Inc., "Industry Leader PSS Systems Launches Third Generation of Atlas Legal Hold and Retention Management Software," www.pss-systems.com, Aug. 29, 2007,2 pp.

PSS Systems, Inc., Atlas LCC for Litigation, pp. 1-2, www.pss-systems.com (Feb. 2008); PSS Systems, Inc., Map Your Data Sources, www.pss-systems.com (Feb. 2008).

PSS Systems, Inc., Preservation Benchmarks for 2007 and Beyond, www.pss-systems.com, 2007, 3 pp.

Sears, "E-Discovery: A Tech Tsunami Rolls In," National Court Reporters Association, Apr. 2006, 7 pp.

Withers, "Computer-Based Discovery in Federal Civil Litigation," 2000 Federal Courts Law Review Oct. 2, 2000, 26 pp.

Zhu et al., "Query Expansion Using Web Access Log Files," Lecture Notes in Computer Science, 2005, vol. 3588/2005, pp. 686-695, Springer-Verlag Heidelberg, 2005.

"AtlasiPM: Enterprise Retention & Preservation Management," PSS Systems, retrieved from the internet on Jun. 5, 2014 from https://web.archive.org/web/20060313012445/http://www.pss-systems.com/solutions/index.html, Mar. 13, 2006, 2 pp.

"Data Classification and Handling," PSS Systems, retrieved from the internet on Jun. 5, 2014 from hllps:l/web.archive.org/web/20051125040616/http://www.pss-systems.com/solutions/classification.html, Nov. 25, 2005, 2 pp.

"Enterprise Retention Management," PSS Systems, retrieved from the internet on Jun. 5, 2014 from https://web.archive.org/web/20051126015829/http://www.pss-systems.com/solutions/erm.html, Nov. 26, 2005, 2 pp.

PSS Systems, Inc. Litigation Communications and Collections, www.pss-systems.com (2006), retrieved online on Dec. 8, 2010 from archive.org, 1 page.

"mySAP ERP Human Capital Management: Maximizing Workforce Potential," SAP.com, retrieved from http://web.archive.org/web/20060823140053/www.sap.com/solutions/business-suite/erp/hcm/index.epx,on Mar. 30, 2017, 1 pp.

Zhu et al., "Fossilized Index: The Linchpin of Trustworthy Non-Alterable Electronic Records," SIGMOD'05, Jun. 14-15, 2005, pp. 395-406.

\* cited by examiner

SYSTEM AND METHOD FOR MANAGING LEGAL OBLIGATIONS FOR DATA

CROSS-REFERENCE TO RELATED APPLICATIONS

The present application is related to U.S. patent application Ser. No. 11/505,537 filed Aug. 16, 2006, entitled, "Systems and Methods for Utilizing an Enterprise Map to Determine Affected Entities;" U.S. patent application Ser. No. 11/512,880, filed Aug. 29, 2006 and entitled "Systems and Methods for Providing a Map of an Enterprise System;" and U.S. patent application Ser. No. 11/807,145 filed May 24, 2007 and entitled "Conducting Cross-Checks on Legal Matters Across an Enterprise System," all of which are hereby incorporated by reference.

BACKGROUND

Field of the Invention

Embodiments of the present invention relate generally to data management and more particularly to managing legal obligations for data.

Background Art

For legal and litigation purposes, data and evidence within a company is required to be preserved in anticipation of, or during, litigation or other legal matters. Global companies must deal with numerous laws that govern how the company should handle this data. Examples of these legal requirements include how long the information should be maintained, when the data should be preserved for evidence, what uses are permissible while the data is in the company's possession, and how and under what conditions the data may be transported. Some companies may need to comply with thousands of disparate legal retention, preservation, disposal, and privacy rules.

As such, the companies may comprise large legal departments for reviewing, monitoring, and analyzing such laws in countries in which the legal department operates. Each legal department typically has a set of procedures it follows to ensure appropriate compliance. While the legal department has legal and professional obligations under the law for dealing with a broad array of data, the legal department does not have control or custody of the data. The data is, typically, under the control of a corporate information technology (IT) department.

In large companies, the IT department may manage hundreds or thousands of systems and move an incredible amount of data each year. Increasing rate of information flow along with increasing volume of information make it extremely challenging to manage and move data at a speed of business while also ensuring compliance with the many thousands of laws that dictate or constrain data management.

The legal department interprets the law with respect to data, while the IT department manages the data. As such, the two departments must work together to resolve data obligation issues. Typically, a legal department personnel (e.g., a lawyer) uses e-mail to send a single, narrow notice to an IT personnel with instructions for managing data involved in a legal matter. Over a course of a month, thousands of these e-mails may be exchanged between personnel in the legal and IT departments.

Unfortunately, many disadvantages and shortcomings result from the conventional exchange of e-mails or other communications such as phone calls between individuals in the legal and IT departments. First, no management transparency is available. That is, only the individuals sending and receiving the e-mails are aware of the legal instructions and response requirements. Additionally, it is difficult to monitor completion of any legal instruction or monitor for compliance with legal obligations. Furthermore, it is virtual impossible to detect overlapping and conflicting obligations since obligations are only known to each personnel sending or receiving the instructions.

With respect to the IT department, additional burdens and disadvantages exist. For example, IT personnel may need to file and manage countless individual e-mails from various legal department personnel in order to track tasks to perform. Furthermore, since legal tasks are not the primary daily duty of the IT personnel, a single e-mail from the legal department may be lost in an onslaught of other more routine activities and communications. Unfortunately, when IT personnel change roles or leave, it is often difficult to transition tasks to other personnel, and legal duties may be easily forgotten or lost in the process.

Another disadvantage of conventional systems is that the legal department tends to think about elements in a different manner than the IT department. Legal staff is geared to legal issues (e.g., lawsuits and cases); compliance staff may think in terms of classification schemes and laws; and IT staff think in terms of specific systems being managed. Furthermore, such systems may contain data subject to multiple legal issues, laws, and jurisdictions. When legal and compliance instructions are not readily understood by those who must follow or enforce the instructions, error may occur. There are many significant fines, sanctions, judicial reprimands, and public relation disasters that can occur as a result.

SUMMARY

Embodiments of the present invention provide systems and methods for managing legal obligations for data. At least one legal obligation may be determined for a matter. Based on the legal obligation, workflow for performing the legal obligations is generated for IT personnel. The workflow may comprise instructions to personnel responsible for data management of one or more affected systems containing the data. The instructions are provided in the context of the affected systems and actions to be performed with respect to those affected systems. These instructions may then be made available via an information portal.

In exemplary embodiments, the information portal is established to provide a visual interface of legal obligations and workflow required to be administered by IT personnel. The information portal is also accessible by legal personnel involved in executing the workflow or otherwise associated with insuring compliance with legal obligations for the matter. The information portal may provide status of all workflows, highlight upcoming and past due workflow deadlines, as well as flag conflicting obligations or workflows.

DETAILED DESCRIPTION OF EXEMPLARY EMBODIMENTS

Embodiments of the present invention provide an exemplary system and method for managing legal obligations for data. In exemplary embodiments, an information portal is established which provides a visual interface of legal obligations and workflow required to be administered by IT personnel within an enterprise. Legal obligations may comprise actions that are required to be performed with respect to a matter, and may be based on policies (e.g., retention policies, privacy law policies, security policies). These legal obligations may include, for example, a legal hold to preserve potential evidence data in place or collect potential evidence data. Based on the legal obligations, workflow (e.g., instructions) may be provided to individuals to comply with the legal obligations. Because the information portal is accessible by all legal and IT personnel, the information portal may display in a single location all relevant obligations and workflow to each personnel independently of who recorded the obligation or initiated the request. Additionally, exemplary embodiments of the present invention provide cross checks, resolve conflicts, and perform compliance checks on legal obligations, as well as insure completion of workflow associated with the legal obligation and proper access control on the data.

In exemplary embodiments, the legal obligations are determined, in part, by utilizing an enterprise map associated with the enterprise along with policy, rules, and regulations. The map comprises relationships between various objects that represent the data comprising the enterprise. Based on these relationships in the map, affected entities (e.g., people and systems under a legal obligation for a matter) may be determined. Affected people may comprise individual employees, record coordinators and administrators responsible for a class of information or associated with an information repository, and system administrators and IT personnel responsible for the data repositories along with names, contact information, e-mail addresses, organizations, and location of the employees. Affected systems may comprise the repositories storing data of interest (e.g., data under a legal hold).

Figure 1:
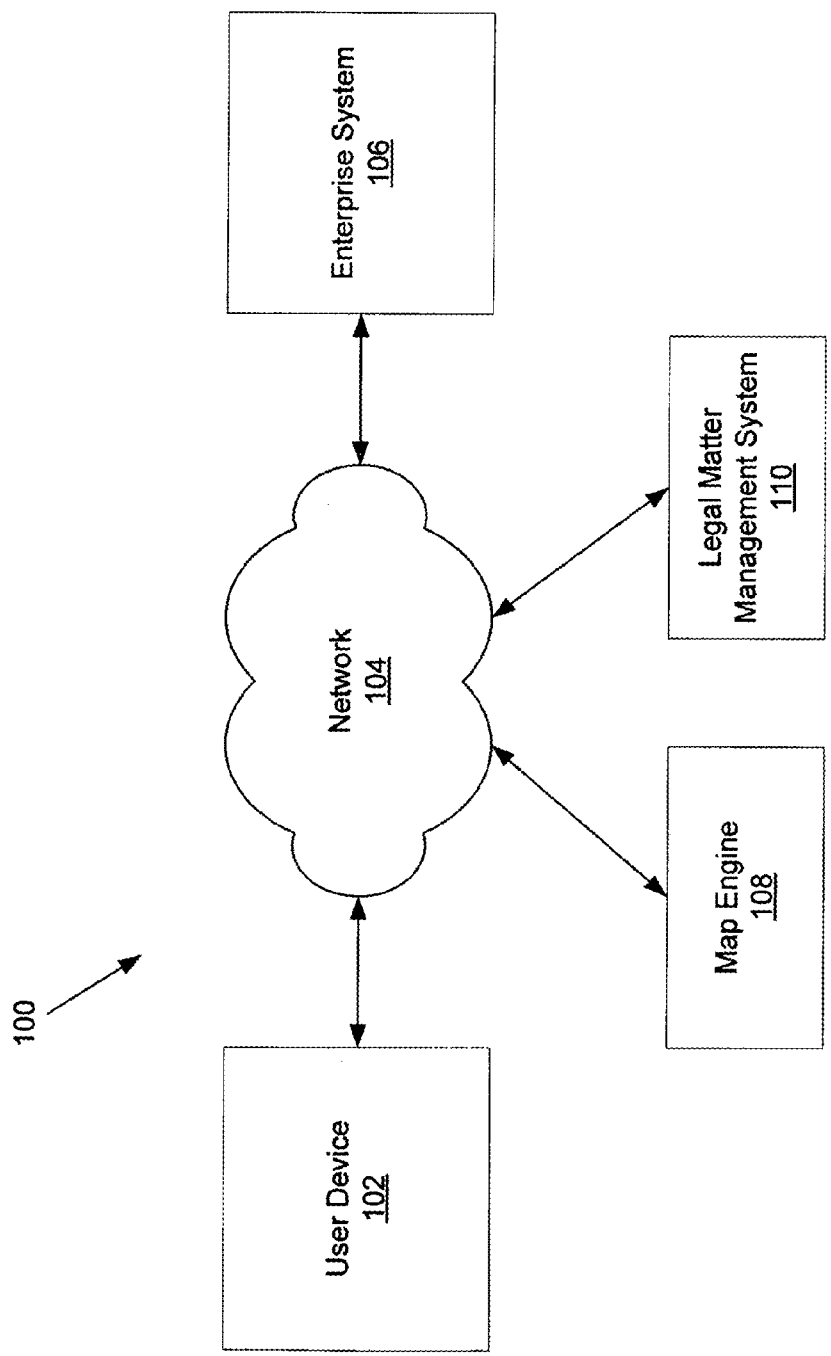
FIG. 1 is an exemplary environment in which embodiments of the present invention may be practiced.

FIG. 1 shows an exemplary environment 100 in which embodiments of the present invention may be practiced. The environment 100 comprises at least one user at a user device 102 coupled via a network 104 to an enterprise system 106. Alternatively, the user device 102 may be coupled directly to the enterprise system 106 or access the enterprise system 106 from within the enterprise system 106. In exemplary embodiments, the network 104 may be a local area network, a wide area network, peer-to-peer network, or the Internet. In some embodiments, more than one network and/or more than one type of network may be utilized to allow the components of the environment 100 to communicate with each other.

Any number of users and user devices 102 may be present in the environment 100 at any one time. The user may comprise an IT personnel or a legal department personnel. The legal department personnel may access the environment 100 to determine legal obligations with respect to matters the legal department personnel is associated with. The legal obligations (e.g., preservation and collection of data) may then be assigned to IT personnel for implementation. The IT personnel may access the environment 100 to determine what workflow the IT personnel needs to perform with respect to the legal obligations.

In some embodiments, the user device 102 may comprise an optional business application (not shown) that performs actions related to managing legal obligations for data. For example, the business application may interact with a litigation management engine 110 to determine legal obligations which need to be performed with respect to a legal matter. In an alternative embodiment, the business application may comprise the litigation management engine 110 and/or a map engine 108. In other embodiments, the business application interacts with a user interface module in the litigation management engine 110, as will be discussed below.

The exemplary enterprise system 106 may comprise any number of servers, client devices, and repositories comprising data. The enterprise system 106 may further comprise a totality of IT, storage and information management systems in an enterprise, including those internally managed, outsourced, etc. The data may comprise documents, files, audio and video media, e-mail communication, and any other information which may be stored in repositories. Repositories may comprise both physical and digital storage media including warehouses, filing cabinets, hard drives, and other digital media storage devices. The repositories may be located anywhere in an enterprise (e.g., in different jurisdictions).

The exemplary map engine 108 generates and maintains a map comprising a structure that represents people, repositories, organizations, and documents via relationships. The map engine 108 utilizes information types, organizations, storage locations, people, and other objects and their relationships, as will be discussed in more detail in connection with FIG. 4, to provide an overall map structure that is used to derive relationships between people, repositories, and organizations. As a result, the user can use the map to determine affected people and systems (e.g., affected entities) in the enterprise system 106. Based on a list of affected people and systems, data may be preserved or collected, for example, as determined by the legal obligations. While the map engine 108 is shown coupled to the enterprise system 106, the map engine 108 may be comprised within the enterprise system 106. Further details regarding the map engine 108 may be found in co-pending U.S. patent application Ser. No. 11/505,537 entitled "Systems and Methods for Utilizing an Enterprise Map to Determine Affected Entities," and U.S. patent application Ser. No. 11/512,880 entitled "Systems and Methods for Providing a Map of an Enterprise System," which are incorporated by reference.

The legal matter management system 110 is configured to allow users to manage preservation and production of data associated with legal matters. The exemplary legal matter management system 110 is discussed herein as being utilized to provide an IT information portal for management of legal obligations associated with legal matters. While the legal matter management system 110 is shown coupled to the enterprise system 106, the legal matter management system 110 may be comprised within the enterprise system 106. The legal matter management system 110 will be discussed in more detail in connection with FIG. 2.

It should be noted that the environment 100 of FIG. 1 is exemplary. Alternative embodiments may, for example, comprise the various components of the environment 100 in communication with each in a different manner. For instance, the user device 102, the map engine 108, and the legal matter management system 110 may all, or in various combinations, be comprised within the enterprise system 106.

Figure 2:
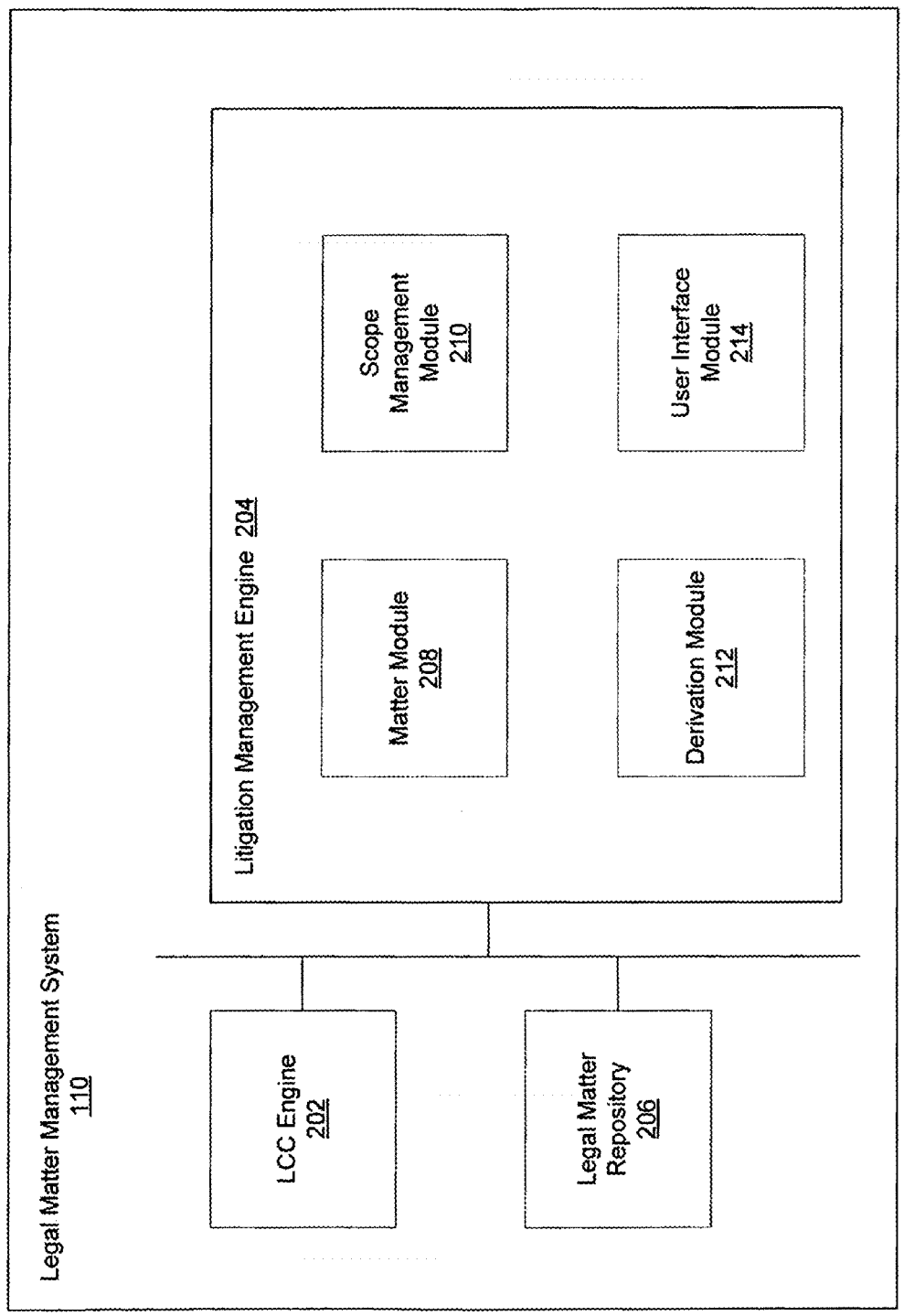
FIG. 2 is a block diagram of an exemplary legal matter management system.

Referring now to FIG. 2, a detailed block diagram of the exemplary legal matter management system 110 is shown. In exemplary embodiments, the legal matter management system 110 comprises a legal communication and collections (LCC) engine 202, a litigation management engine 204, and a legal matter repository 206 configured for storing legal matter information. The LCC engine 202 will be discussed in more detail in connection with FIG. 3. While FIG. 2 is discussed in a context of legal matter management, alternative embodiments allow for management of non-legal or litigation matters (e.g., internal investigations, government regulatory request for information).

The litigation management engine 204 manages the legal matters within the enterprise system 106, and comprises a matter module 208, a scope management module 210, a derivation module 212, and a user interface module 214. Alternative embodiments may comprise more, less, or functionally equivalent modules. Furthermore, some of the modules of the litigation management engine 204 may be comprised in the map engine 108 or vice versa. While the litigation management engine 204 will be discussed in a context of a legal/litigation matter, alternative embodiments allow for the search to be associated with non-legal/litigation matters (e.g. internal investigations, government regulatory request for information).

In some embodiments, some of the components of the litigation management engine 204 are located at the user device 102, and operate within the user device 102 to provide the functionalities described below. In other embodiments, the litigation management engine 204 is completely located at the user device 102. In yet other embodiments, the litigation management engine 204 is completely separate from the user device 102, and the user device 102 accesses the litigation management engine 204 via the network 104.

The exemplary matter module 208 creates and maintains the matter which is managed by the legal matter management system 110. Each matter identifies a legal matter for which legal obligations for data may be managed. The matter may also identify the attorneys and other legal staff that are working on the matter. By identifying the relevant legal staff, workflow may be automatically generated for the legal staff upon determination of affected people and systems and associated data. The legal staff may then via the IT portal instruct IT personnel to preserve, manage, and/or collect data accordingly for affected systems being managed by the IT personnel. Results of the derivation and collected data may be stored based on the matter in the legal matter repository 206.

The scope management module 210 is configured to receive scope parameters from a user (e.g., legal personnel) for the derivation of key people and systems (e.g., the affected entities). In exemplary embodiments, the scope parameters may comprise one or more map objects that are known to intersect the matter in some manner. For example, if the matter involves a specific organization or information type, the user can provide those objects as the scope parameters. It should be noted that any number of initial scope parameters may be utilized. Scope and map objects will be discussed in more detail in connection with FIG. 4.

In exemplary embodiments, the derivation module 212 is configured to use the scope parameters to traverse the map in order to determine the affected people and systems (i.e., affected entities) associated with the matter based on relationships identified within the map. In some embodiments, the derivation module 208 may work with one or more components of the map engine 108 to traverse the map. Thus, for example, knowing at least one root element (e.g., an object) associated with the matter, further objects and/or the affected people and systems may be derived. For instance, for a given organization specific classification code (OSCC), items of data classified by the OSCC may be stored in a particular information repository (e.g., file share or document management system). Additionally, there is a steward (i.e., a person responsible for the information record keeping) for each repository. In exemplary embodiments, these stewards are affected IT personnel who need to be notified about the matter and associated legal obligations to be performed with respect to relevant data.

Once the list of affected entities with potential information or knowledge relevant to the matter is identified by the derivation module 212, the list may be stored, for example, by legal matter. In exemplary embodiments, the list is stored in the legal matter repository 206. The list may be stored with additional information including, for example, attorney or paralegal data, matter status (e.g., active, closed), a list of responsible IT personnel, and list of collected data.

Based on the results of the derivation, various workflow and notifications may be generated. The workflow and notifications will be discussed in more detail in connection with FIG. 3 below.

The exemplary user interface module 214 is configured to allow the user to utilize the litigation management engine 110 to derive a list of affected entities. In some embodiments, the user interface module 214 provides a graphical user interface (GUI) which allows the user to create the matter and provide the scope parameters for the derivation. In further embodiments, the user interface module 214 provides GUIs for showing results of the derivation and/or resulting workflow. In some embodiments, the user interface module 214 may provide the IT information portal.

The legal matter repository 206 may also store collected data from affected entities. The data may comprise list of preserved and collected data as well as information regarding when the data was collected, when legal obligations and workflows were created for IT personnel, when confirmations or responses were received, and so forth.

While FIG. 2 shows the LCC engine 202 and the litigation management engine 204 as separate engines, alternative embodiments may combine the two engines 202 and 204 into a single engine. In further embodiments, some of the modules within the two engines 202 and 204 may be interchangeably placed in the other engine 204 and 202.

Figure 3:
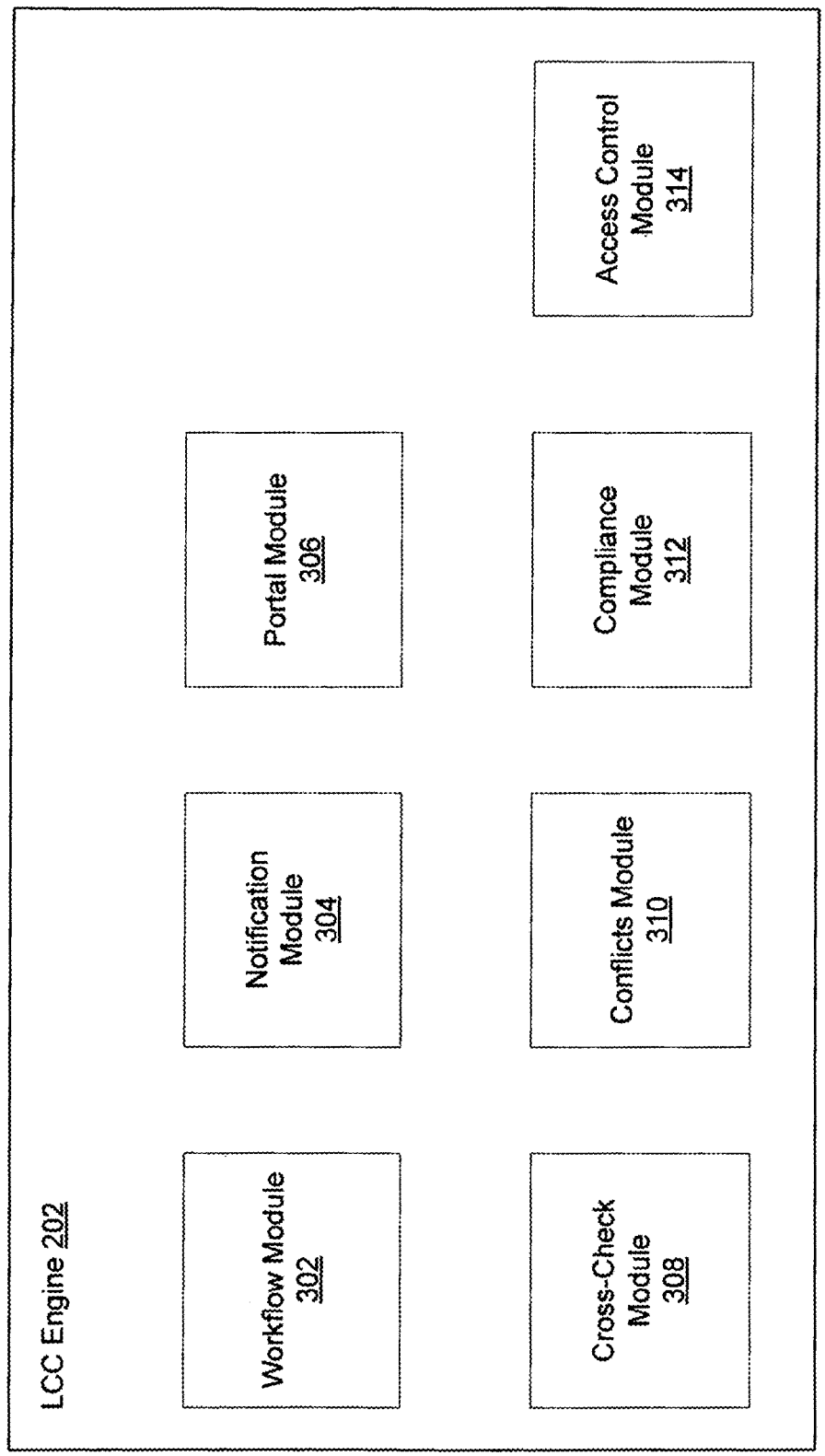
FIG. 3 is a block diagram of an exemplary legal communication and collection engine.

Referring now to FIG. 3, the exemplary LCC engine 202 is shown in more detail. The LCC engine 202 is configured to allow users 102 to manage compliance with legal obligations with respect to the affected entities. In exemplary embodiments, the LCC engine 202 comprises a workflow module 302, notification module 304, portal module 306, cross-check module 308, conflicts module 310, compliance module 312, and access control module 314.

The exemplary workflow module 302 generates workflow including instructions for IT personnel based on the legal obligations determined by the derivation module 212 for each matter. The legal obligations may be defined in terms of business and legal context (e.g., jurisdiction, retention policy, billing codes, OSCC). The workflow module 302 is configured to "translate" the legal obligations into the appropriate IT context. Thus, for example, a matter may generate a legal obligation to preserve all data associated with a particular billing code for a particular organization. The workflow module 302 may determine the affected systems (e.g., repositories) storing data having the billing code for the organization, and may identify the appropriate IT department which manages the affected systems. The workflow generated may then be directed to the IT department or personnel and identify the particular affected systems to preserve data within.

In some embodiments, the workflow may be explicitly issued by the legal department. For example, a legal personnel may determine that all data associated with a particular organization during a particular time frame should be preserved. The legal personnel may explicitly issue instructions to an IT personnel associated with the organization and repositories of the organization (which have been identified by the derivation module 212) to execute the hold and preserve all such data. The workflow may be issued in "IT terms." For example, the workflow may identify the ten systems that are affected by the legal obligation within which the IT personnel may now manage preservation of data. Accordingly, the explicit instructions may be posted on the information portal.

In further embodiments, the workflow module 302 may automatically determine workflow based on the search results from the derivation module 212. In exemplary embodiments, the list of affected entities drives processes to preserve and produce data associated with the affected entities. Workflow may also comprise identifying what protocols should be used to collect data from affected systems, and flagging any relevant data (e.g., records classification) and retention schedules. These preservation workflow and collection processes may comprise sending legal hold notices and/or notices to produce the data or evidence to the affected people. The legal hold notices will instruct the affected people not to destroy data related to the matter. In exemplary embodiments, the affected people include the IT personnel responsible for managing an affected system (e.g., repository) containing relevant data. The production workflow process may also comprise automatic generation of a collection workflow. These inherent workflow or instructions may be marked or indicated differently on the information portal so as to distinguish from explicit instructions generated by the legal personnel.

The notification module 304 is configured to provide notices based on the workflow determined by the workflow module 302. For example, if the workflow module 302 determines that an IT personnel or steward of a repository needs to be notified not to destroy documents associated with a particular OSCC over a certain time period, the notification module 304 may provide a notification on the information portal via the portal module 306. In further embodiments, the notification module 304 may also generate an additional email notice containing this information (e.g., the OSCC, time period, and steward name and contact information) which may be sent to the IT personnel. The actions of the notification module 304 may also be tracked to determine compliance with the legal obligations of the workflow.

The exemplary portal module 306 generates a user interface through which IT personnel and legal department personnel may monitor compliance with various legal obligations associated with the generated workflow. The information portal may provide listings of legal policies (e.g., retention, disposal, preservation of evidence, restriction of use, transport) for IT personnel. Furthermore, the information portal organizes and provides information and workflow to IT personnel in an IT context. In various embodiments, the workflow may be organized by instruction date or deadline; system, data area, or repository the instructions apply to; physical or business location where data resides; and so forth. Because the information portal is accessible by all members of the IT department, various workflows may be monitored, shared, delegated, or distributed between the members of the IT department.

In exemplary embodiments, the portal module 306 (e.g., in conjunction with the notification module 304) provides tracking and task aging of the IT workflow. For example, time of workflow generation, persons receiving the workflow, and type of workflow may be tracked. Thus, deadlines for upcoming and past due workflow may be monitored (e.g., by the notification module 304). Notifications may be sent or entries on the information portal may be highlight or otherwise distinguished to indicate the upcoming or past due deadlines. Furthermore, the portal module 306 may track the completion of the workflow associated with the legal obligation.

The exemplary cross-check module 308 is configured to cross-check correlations between legal obligations. The cross-check module 308 determines if legal obligations overlap and insure proper execution of workflows in light of the overlaps. For example, if one overlapping legal hold (i.e., legal obligation) on relevant data is closed or removed, one or more other legal holds will still apply to the same relevant data. Consequently, it is critical that responsible IT personnel be aware of the overlap and avoid taking any action to dispose of the data, despite the fact that one legal hold was released.

In some embodiments, the cross-check module 308 receives criteria (e.g., affect system of interest or a matter of interest) for performing the cross-check. In one embodiment, the cross-check module 308 reviews the legal matter repository 206 to determine all matters associated with the criteria. In a further embodiment, the cross-check module 308 may trigger the derivation module 212 to determine a list of matters involving the criteria. Based on the cross-check criteria, the cross-check module 308 may determine the legal obligations (e.g., legal hold) in effect for the affected entities across all matters.

Conflicting legal obligations are managed by the exemplary conflicts module 310. Accordingly, the conflicts module 310 determines if there are any conflicts involving legal obligations and, in some embodiments, resolves the conflicts or drives additional workflows (e.g., involving the different parties who generated or recorded the conflicting obligations or workflows) to resolve the conflicts. In exemplary embodiments, conflicts may be flagged or indicated on the information portal and conflict management policies (e.g., what to do in an event of a conflict) may be provided so that the user may review such policies. In some embodiments, the legal personnel may determine and detect such conflicts prior to issuing any conflicting workflow to IT personnel. For example, a privacy officer may be given an ability to track which employees have departed for close to one year in a given jurisdiction. Based on European data protection laws requiring all personal data to be destroyed no later than one year after employee departure, the privacy officer may be given an ability to trigger a disposal workflow (e.g., to be submitted to the relevant IT personnel). Prior to triggering the disposal workflow, the information portal may indicate that the data target of the disposal workflow is known to be under an active legal hold, and contact information may be provided for the legal personnel responsible for that legal hold. Alternatively, the privacy officer may be provided an opportunity or required to start an approval workflow with the relevant legal personnel for approval of the disposal workflow.

In other embodiments, the conflicts may be shown to IT personnel, so that the IT personnel will detect the conflicts while attempting to execute the associated workflow. In the context of the example above, the IT personnel may directly receive the disposal workflow. In such cases, an embodiment of the present invention may first show the disposal workflow triggered by the privacy law obligation. At the same time, the invention may indicate in the same information portal that the data related to this employee is under a legal hold. The information portal may provide contact information, for example, for the privacy officer and paralegal responsible for their respective obligations, so that the IT personnel can easily contact them in order to resolve the conflict. Alternatively, the information portal may provide an ability to the IT personnel to reroute the disposal workflow back to the privacy officer and paralegal for review and approval.

The exemplary compliance module 312 is configured to determine compliance to the legal obligations. Compliance may include insuring that jurisdictional rules are followed for the legal obligations. In exemplary embodiments, compliance requirements may be stored and/or accessed by the compliance module 312. Compliance requirements may include information regarding U.S. discovery and privacy rules and European data protection rules. The physical locations of the affected entities are also key attributes as they determine the policies and obligations that apply based on the governing laws in each jurisdiction.

Compliance requirements may also include other key attributes defined for the systems such as format and structure of data in the systems for U.S. litigation requirements, capacity of the system to secure personally identifiable information and confidential information to country standards, capacity of the system to preserve data, capacity of level of granularity supported by the system when enforcing preservation obligations such that future retention policies may be safely enforced without manual reconciliation with know preservation obligations. Other key attributes which may be relevant to legal obligations may comprise stewardship of the system and its data including personnel responsible for preservation workflow, collection workflow, and enforcement workflow, and access restriction workflow.

Based on these key attributes and compliance requirements, compliance (and non-compliance) patterns with respect to these key attributes may be determined. For example, affect systems without capacity to properly manage personal or confidential information in a jurisdiction where specific requirements for handling such data may be detected by the compliance module 312. Additionally, conflicts in jurisdiction law may be detected by analyzing the source of data (e.g., line of business, classification scheme, geographic location) and location of the affected system. Legal obligations with respect to these two locations/jurisdictions may be determined and compared to determine compliance issues.

In further embodiments, the compliance module 312 may compare legal obligations and/or workflow, status of the systems, and the key attributes discussed above by country, system area, policy area, responsible IT or legal departments, or other combination of groupings to detect mismatches in compliance. Policy areas may comprise legal retention periods, processing restrictions, disposal requirements, restrictions on transport, and restrictions on processing of data as defined by country or district law. Additionally, policy areas may include evidence preservation requirements as dictated by lawsuits or government investigations.

In some embodiments, the access control module 314 determines a level of access the IT personnel is allowed. In exemplary embodiments, visibility to the systems managed by the IT personnel as well as any legal policy instructions (e.g., workflow) may be limited based on compliance reasons. As such, IT personnel will not be able to access information that would be considered useless for the IT personnel or restricted. The access control module 314 may control access based on legal requirements and processes. For example, if the IT personnel is instructed to deal with a particular legal hold in a certain matter, the IT personnel will not be given access to all data in the matter, only access to data related to the action the IT personnel needs to perform. Access may also be based on a business unit or line of business. Some business units have different confidential levels for data, such as customer data. Thus, the IT personnel may be allowed to track data, but there may be boundaries set as to access to the data. Finally, access may be based on jurisdiction. While some actions may be allowable within one country, they may not be allowable if remotely accessed from another country (e.g., privacy levels based on jurisdictional boundaries).

As such, the access control module 314 may customize the view of the information portal to each user based on their level of access. Thus, each IT personnel's view of the information portal may be different. The access may be determined by a profile associated with each user (e.g., an attorney may have access rights as default to more information than IT staff). The access may also be determined based on the workflow. For example, if the IT personnel needs to collect relevant data, then the IT personnel may be grant rights to collect, delete, edit, and view the data.

Figure 4:
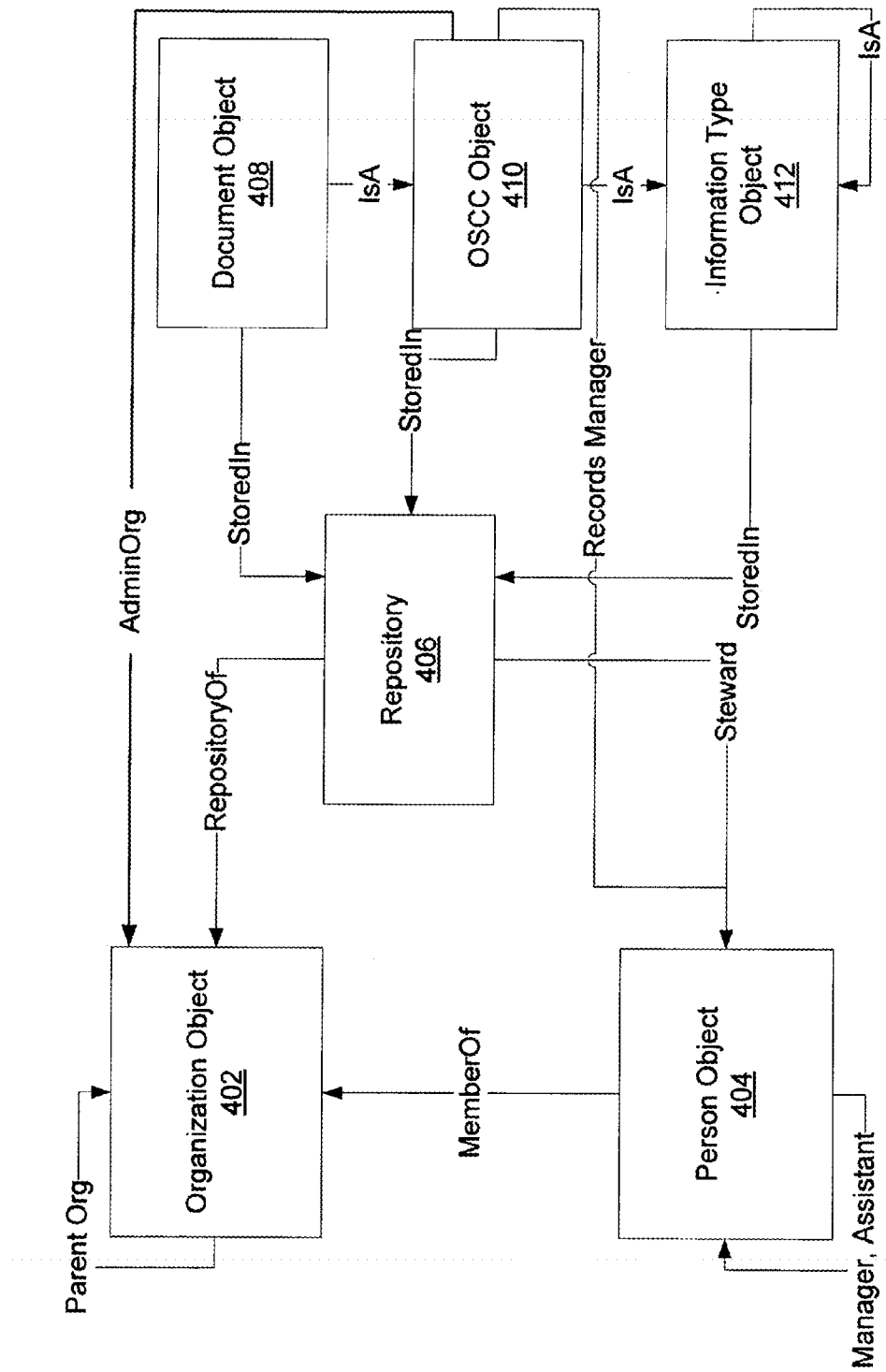
FIG. 4 is a schematic diagram of exemplary relationships between objects within a map of an enterprise.

FIG. 4 illustrates a schematic diagram of exemplary relationships of primary objects in the map used for supporting derivation of a list of affected people and/or systems. Exemplary embodiments of the present invention take advantage of the fact that people have certain types of relationships to organizations, and information repositories have a responsible person/people (e.g., stewards such as IT personnel) and associated disposal and retention policies. The relationships may be based on such objects as organizations, author, and repository, for example. In exemplary embodiments, the structure of the map is based on the relationships between these objects. As discussed herein, the map establishes exemplary relationships between the objects as shown.

In exemplary embodiments, each document is classified with an organization specific classification code (OSCC). The OSCC identifies both an information type and an organization within a single classification code. Any number of organizations may comprise the enterprise system 106. For example, ADM-212 may be an OSCC only utilized by a New York office (i.e., organization) of an investment bank to classify administrative internal memos (i.e., information type).

Each OSCC may also have a policy associated with the OSCC. All documents having the particular OSCC are subject to the same policy. These policies may comprise a custodian (i.e., storage location), a record manager (e.g., IT department personnel), and other important information which is pertinent to all documents sharing the OSCC. In some embodiments, the policy may also comprise information such as a retention period, security and access, and legal holds.

Because the OSCC provides an intrinsic relationship between the organization, information type, and any policies associated with the OSCC, a user is able to find relevant information more easily and quickly. Based on people, custodians, organizations, or information types known to be relevant to a legal matter, for example, a subset of all enterprise OSCCs can be derived that are relevant to the legal matter. More specifically, the user (e.g., legal personnel) can search for a specific OSCC and identify systems and people associated with the legal matter including the IT department or personnel managing the affected system. In further embodiments, the user may be able to search for and identify exact data and/or evidence that are classified with a given OSCC.

An organization object 402 includes information about the organization or other groupings of people. In some embodiments, these organizations may be hierarchically organized. Any type of organization object 402 may be utilized. For example, the organization object 402 may include a name of the organization, a parent organization, persons in the organization, repositories or storage mediums utilized by the organization, geography associated with the organization, organization locations, accounting codes, and so forth. One or more organizations may be represented by the organization object 402 and the one or more organizations may be designated according to a hierarchical structure, such as a parent organization. By knowing an organization and thus the associated repository or systems, proper IT department and personnel may be identified.

A person object 404 represents an individual with a role within the organization. For example, the person object 404 may include an employee in the organization. The person object 404 may be associated with one or more items of information by a name, contact information, role in the organization, relationship with other persons 404, organizational affiliations, repository affiliations, responsibilities, job title, and so forth. The person object 204 may be related to the organization object 402 by virtue of a "MemberOf" relationship, which indicates that each person is a member of one or more organizations. For example if a person is an IT personnel working at a NY office of an investment bank, the user (i.e., person object 404) is affiliated with the NY office (i.e., organization object 402).

A repository object 406 represents storage locations. The repository object 406 may include any electronic or non-electronic information repositories, such as a warehouse, a file server, or any other storage mediums. The repository object 406 may include or be related to name, system type and details, physical location, network location, access methods, stewards and IT personnel (e.g., the persons and the person object 404 responsible), the organizations that use the repository (e.g., organization object 402), information types stored in the repository (e.g., information type object 412), and so forth. Accordingly, the repository object 406 has a relationship with the other objects shown in FIG. 4 and clearly identifies the affected IT personnel.

A document object 408 represents information about documents, papers, text, files, metadata, and other items of data stored in a repository. The information represented by the document object 408 is thus related to the repository object 406 by being stored in the repository identified by the repository object 406.

An OSCC object 410 is associated with a classification code (i.e., the OSCC) assigned to each item of data associated with the document object 408. The OSCC object 410 may indicate information type, location in the repository 406 for the information, policy information, such as a records manager, and so forth. Once the OSCC object 410 is assigned to the item of data associated with the document object 408, the classification may be stored in a repository associated with the repository object 406. Each classification may be associated with one or more IT personnel responsible for managing the information assigned the specific classification. Thus, the person object 404 may be related to the OSCC object 410.

In exemplary embodiments, information represented by the document object 408 is an instance of the OSCC object 410. In other words, the information represented by the document object 408 is one of many possible specific occurrences that belong to the generic information classification defined by the OSCC. For example, an offer letter of an employee of a New York branch of a company will belong to the classification code "Employment agreement" (i.e., OSCC) for the "New York Division" organization.

An information type object 412 is associated with the OSCC object 410 classification. The items of data may be organized as a hierarchical taxonomy, for example, utilizing the information type. The information type object 412 includes name, identifiers, such as record keeping codes, parent type, repository affiliations (i.e., default location for the information), organization affiliations, and so forth. An information type is a broad class of information, such as "Accounting Invoice" or "Quarterly Financial Report", for example. A data type or document may, optionally, be associated with one or more repositories via the repository object 406 discussed herein. Accordingly, the information type object 412 is related to the repository object 406 and to the OSCC object 410. In exemplary embodiments, the OSCC is a more specific class of information that a given information type uses within a given organization.

Because various relationships between the one or more objects are known, the one or more items of data that may satisfy a matter may be more easily located and legal obligations and workflow generated for appropriate IT personnel to manage the data. As discussed herein, the litigation management engine 110 can determine affected people and systems using the objects and their relationships. Although FIG. 4 shows various relationships between various objects that represent the information in the enterprise system 106, further embodiments may comprise other objects and/or relationships between the objects and still fall within the scope of various embodiments. It should be noted that in some embodiments, the object may comprise meta-data.

Figure 5:
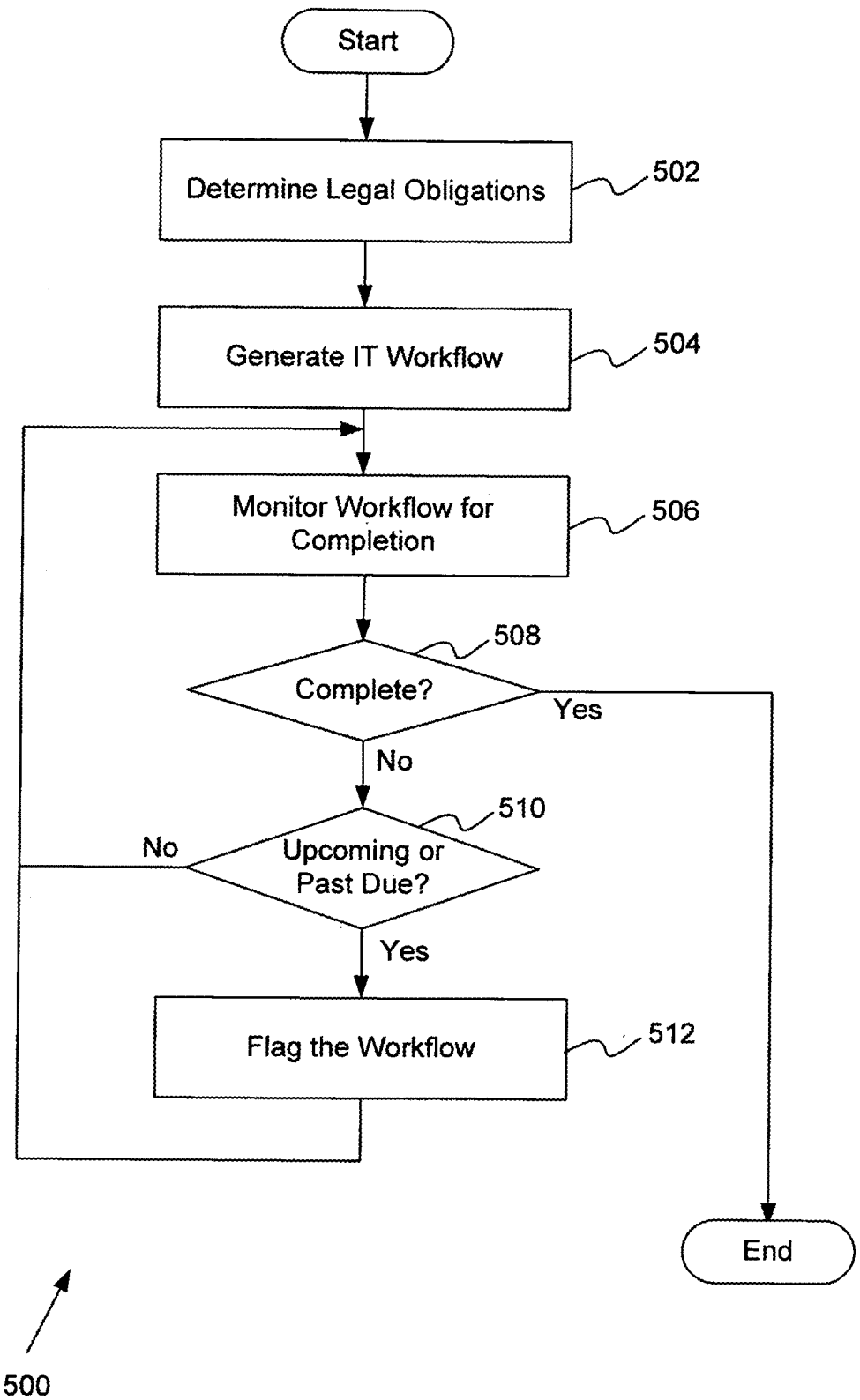
FIG. 5 is a flowchart of a method for determining and managing legal obligations for data.

Referring now to FIG. 5, a flowchart 500 of a method for managing legal obligations for data is shown. In step 502, the legal obligation is determined. In some embodiments, a new (current) matter is created. A review of the map may identified relevant data as well as the affected entities possessing the data. Legal obligations (e.g., place legal hold, collect data) with respect to the relevant data may then be determined.

Once the legal obligations are identified, workflow may be generated for the IT department associated with the legal obligations in step 504. In exemplary embodiments, the workflow module 302 generates workflow for the IT personnel. The workflow comprises instructions with respect to data to be performed in order to satisfy the legal obligations. Step 504 will be discussed in more detail in connection with FIG. 6.

The workflow may then be monitored for completion in step 506. In exemplary embodiments, the portal module 306 may work with the notification module 304 to monitor the workflow. It should be noted that the monitoring may be continuous. If the workflow is complete in step 508, then the information portal may be updated to indicate completion. However, if the workflow is not complete, then a determination is made as to whether the workflow has a fast approaching or past due deadline in step 510. If the workflow is past due and/or will be due relatively soon, the workflow may be flagged in step 512. In some embodiments, the notification module 304 may instruct the portal module 306 to highlight or mark the flagged workflow.

Figure 6:
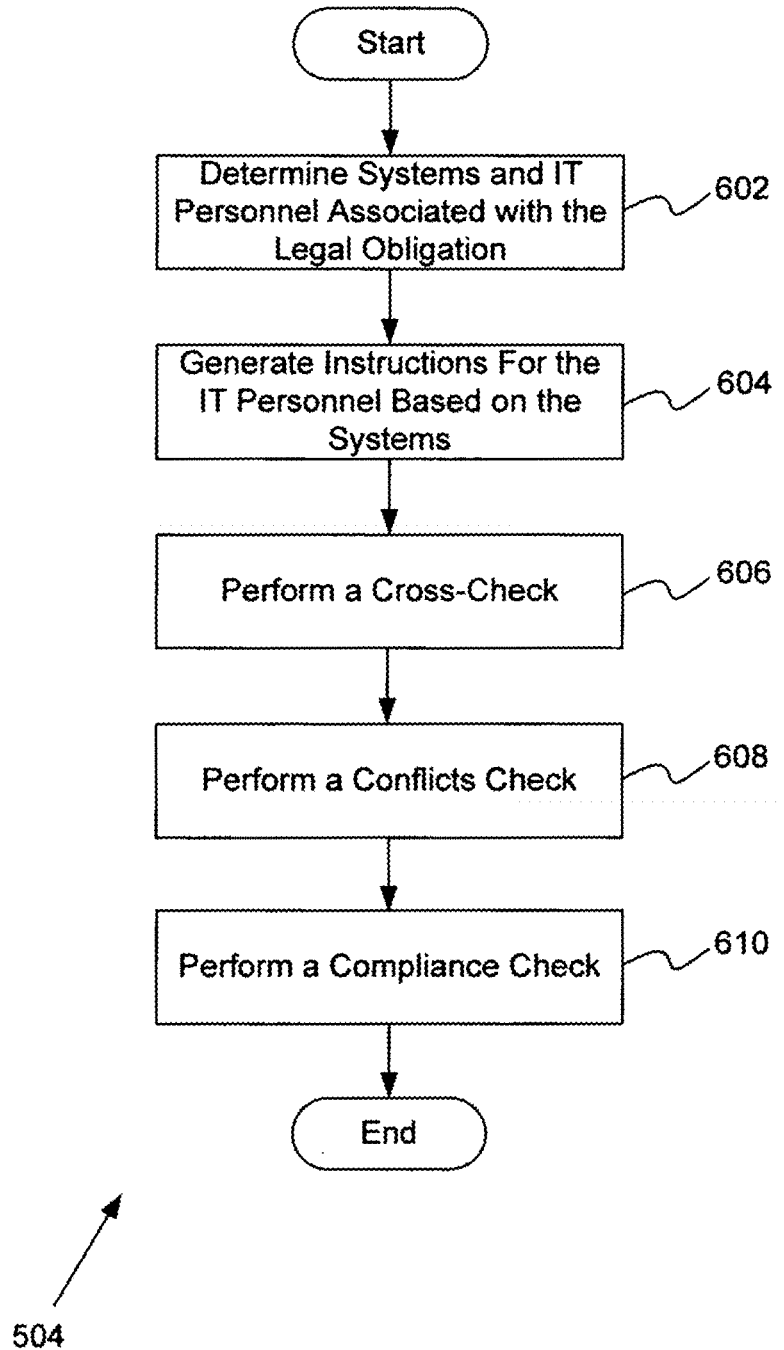
FIG. 6 is a flowchart of a method for generating IT workflow.

Referring now to FIG. 6, a flowchart of an exemplary method for generating IT workflow (step 504) is shown. In step 602, affected systems along with the IT department/personnel associated with the affected systems of the legal obligation are determined. In some embodiments, the determination of the legal obligations may also result in a list of affected entities. As such, the workflow module 302 can identify which systems and IT department/personnel are involved in with the legal obligation. For example, the derivation module 212 may determine the IT personnel based on the affected systems. That is, given affected systems (e.g., data repositories), the derivation module 212 can determine which IT personnel are responsible for managing the affected system.

In step 604, specific workflow (i.e., instructions) for IT personnel are generated. The workflow will comprise instructions in the form of actions to be taken with respect to certain systems managed by the IT personnel. For example, the instructions may identify the ten systems that are affected by the legal obligation within which the IT personnel may now manage preservation or collection of data.

A cross-check may be performed in step 606. In exemplary embodiments, the cross-check module 308 determines if legal obligations overlap and insure proper execution of workflows in light of the overlaps. Based on the cross-check criteria, the cross-check module 308 may determine the legal obligations (e.g., legal hold) in effect for the affected entities across all matters.

In step 608, a conflicts check may be performed. In exemplary embodiments, the conflicts module 310 determines if there are any conflicts involving legal obligations and, in some embodiments, resolves the conflicts. In exemplary embodiments, conflicts may be flagged or indicated on the information portal and conflict policies (e.g., what to do in an event of a conflict) may be provided so that the user may review such policies. In some embodiments, the legal personnel may determine and detect such conflicts prior to issuing any conflicting workflow to IT personnel. In other embodiments, the conflicts may be shown to IT personnel, so that the IT personnel will detect the conflicts while attempting to execute the associated workflow.

In step 610, a compliance check may be performed. The exemplary compliance module 312 is configured to determine compliance of the legal obligations. Compliance may include insuring that jurisdictional rules are followed for the legal obligations. In some embodiments, conflicts in jurisdictional rules may be detected by analyzing the source of data (e.g., line of business, classification scheme, geographic location) and location of the affected system. Additionally, based on key attributes of the systems and compliance requirements, compliance (and non-compliance) patterns with respect to key attributes may be determined. For example, affect systems without capacity to properly manage personal or confidential information in a jurisdiction where specific requirements for handling such data may be detected by the compliance module 312.

The method of FIG. 6 is exemplary. Alternative embodiments may contemplate practicing the steps of FIG. 6 in a different order, or provide more or less steps. For example, the checks of steps 606-610 may be practiced in a different order relative to each other or be practiced simultaneously. Alternatively, some or all of the check steps 606-610 may be practiced prior to generating the instructions for IT personnel (e.g., after determination of the legal obligations in step 502) or after generation of the IT workflow (e.g., step 504).

Figure 7:
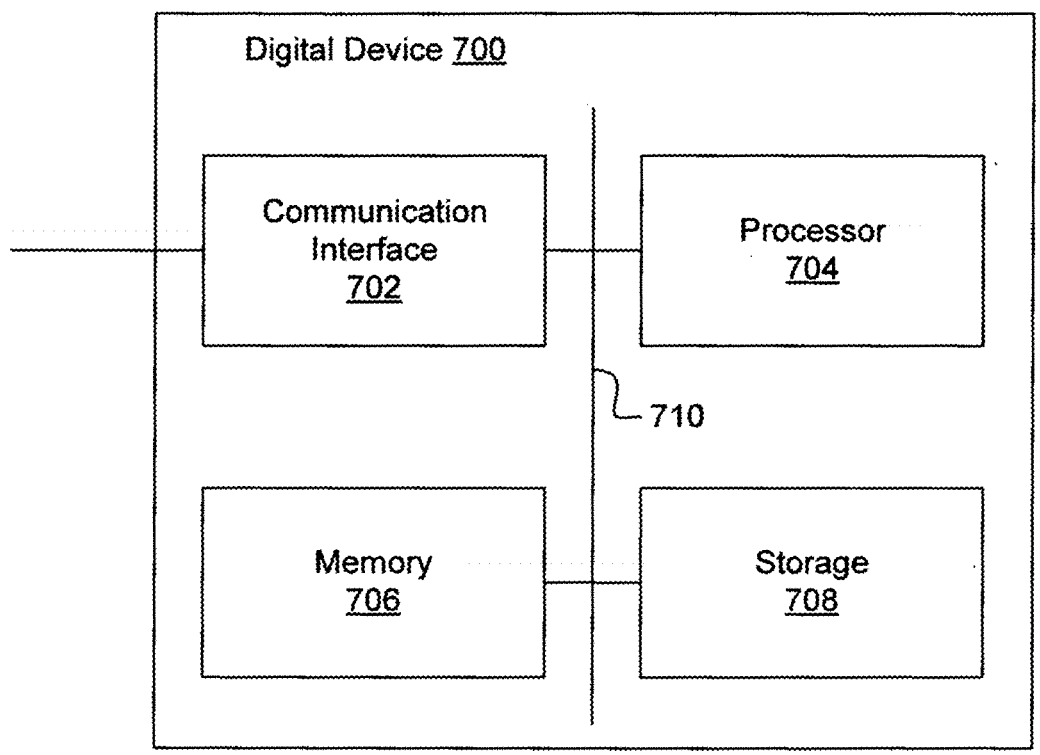
FIG. 7 is a block diagram of an exemplary digital device.

FIG. 7 shows an exemplary digital device 100. The digital device 700 may comprise the user device 102, the enterprise system 106, map engine 108, and/or the legal matter management system 110 according to various embodiments. The digital device 700 comprises, at least, a communications interface 702, processor 704, memory 706, and storage 708, which are all coupled to a bus 710. The bus 710 provides communication between the communications interface 702, processor 704, memory 706, and storage 708.

The processor 704 executes instructions. The memory 706 permanently or temporarily stores data. Some examples of memory 706 are RAM and ROM. The storage 708 also permanently or temporarily stores data. Some examples of the storage 708 are hard disks and disk drives.

Figure 8A:
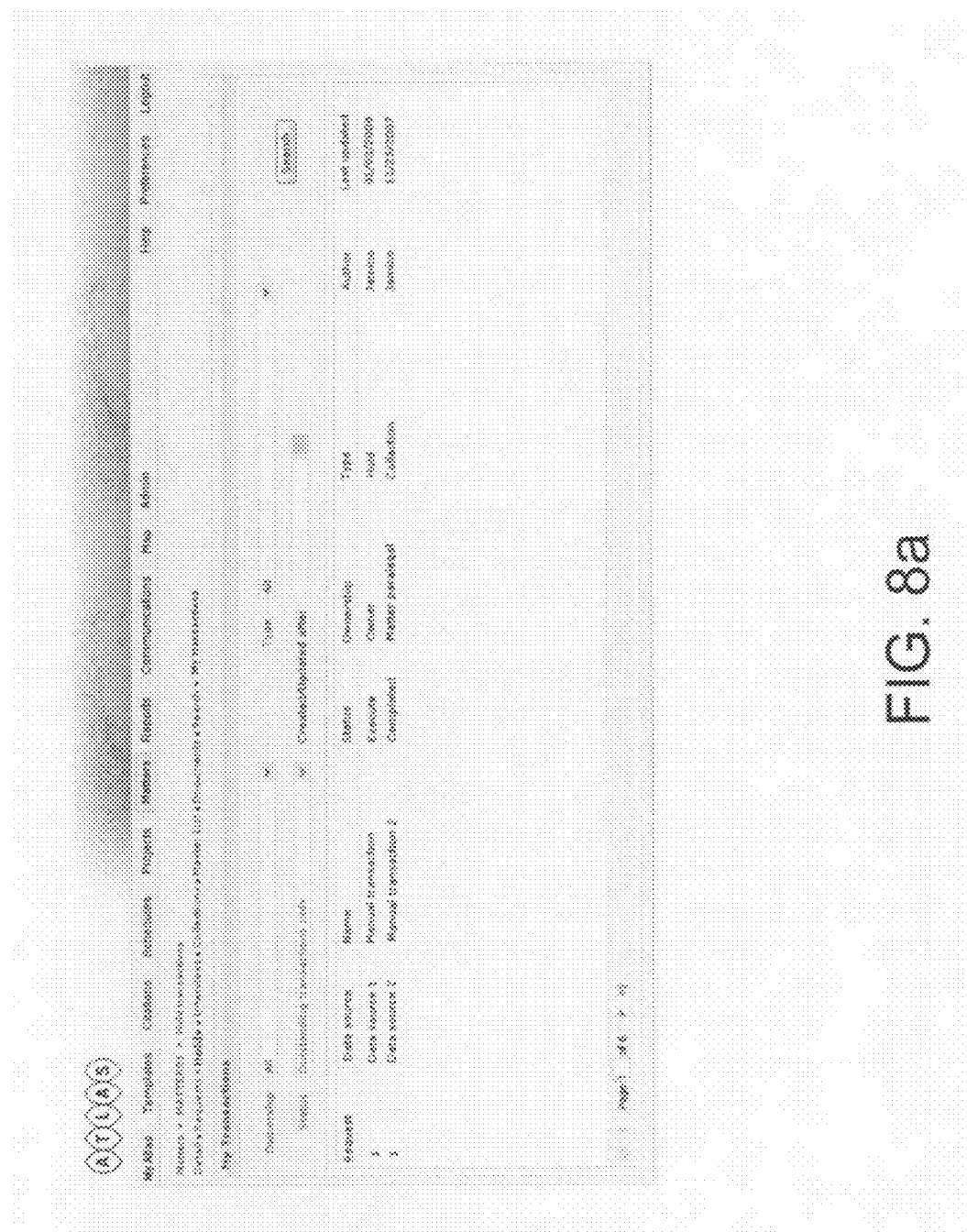
FIG. 8a-FIG. 8d are example views of the information portal.

Referring now to FIG. 8a-FIG. 8d, various examples of the information portal are shown. In FIG. 8a, a user may view all transactions currently assigned to them. The view is across all matters for which the user is associated with. As discussed above, the user may comprise, for example, legal department personnel or IT personnel. In the present example, two transactions are shown. One transaction is a legal hold, and the second transaction comprises a collection request. The legal hold is currently being executed, while the collection request has been completed.

Figure 8B:
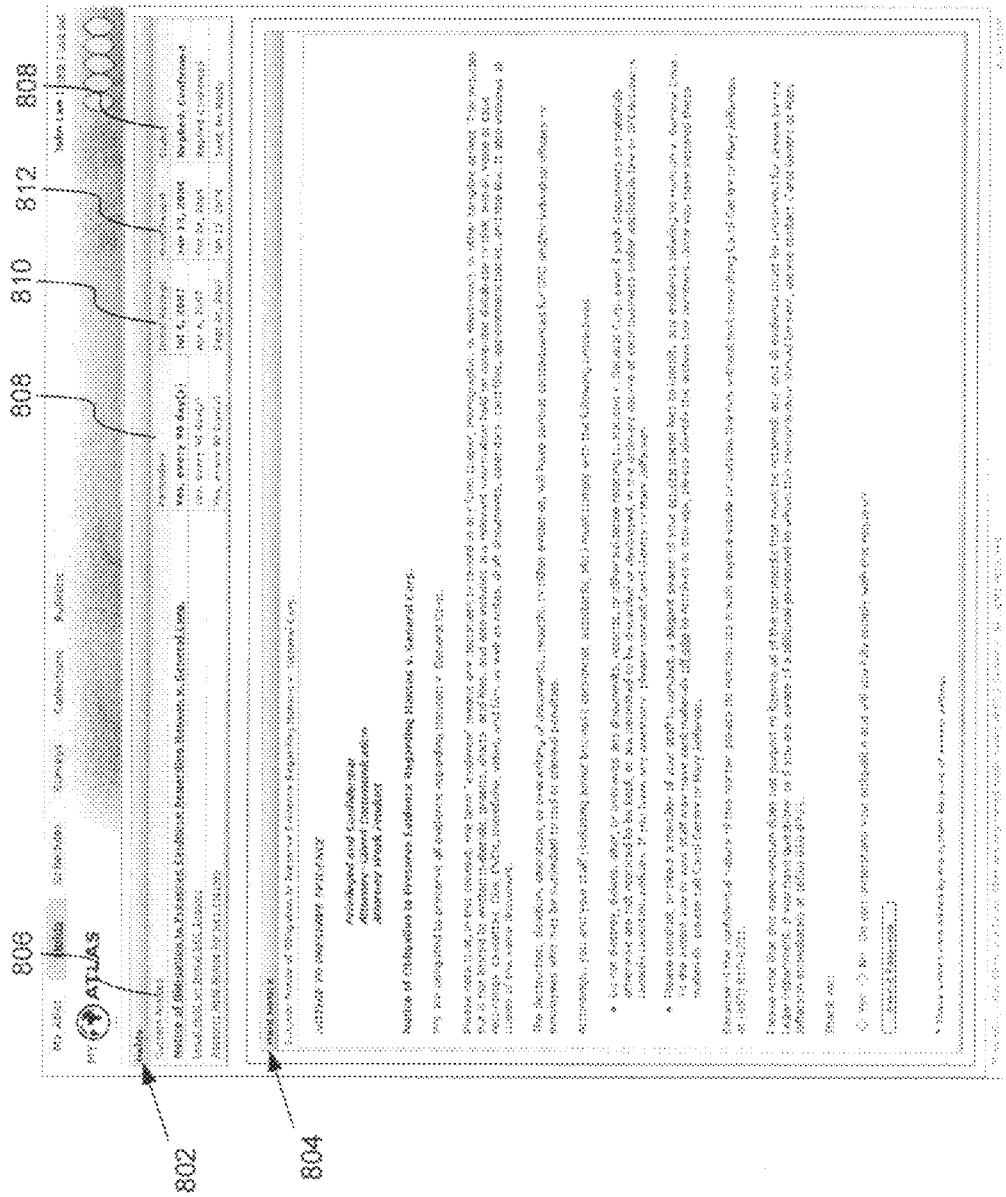

FIG. 8b shows an example of a hold display on the information portal. The hold display may comprise a holds list section 802 and a hold notice section 804. The holds list section 802 displays current hold notices 806 for the user accessing the information portal. The current hold notices may be sorted, for example, in alphabetical order. Alternatively, the notices may be sort by any other means (e.g., initial request date, most recent data, status). The holds list section 802 may also display a reminders column 808, which indicates how often reminders are sent to the user. Additionally, an initial receipt column 810 and a most recent receipt column 812 are provided to indicate a date of a first issuance of the notice to the user (this may be different than the first original notice date, if the user was added after a couple of reminders, for example) and a date of a most recent issuance sent to the user. A status column 814 provides a status to the most recently sent issuance.

The hold notice section 804 displays contents of a hold notice. Thus, when the user selected one of the current hold notices 806, details for the selected hold notice 806 will be displayed. The details may include the associated matter, instructions, and contact personnel for questions, for example. Any information associated with the hold notice may be presented in this section.

Figure 8C:
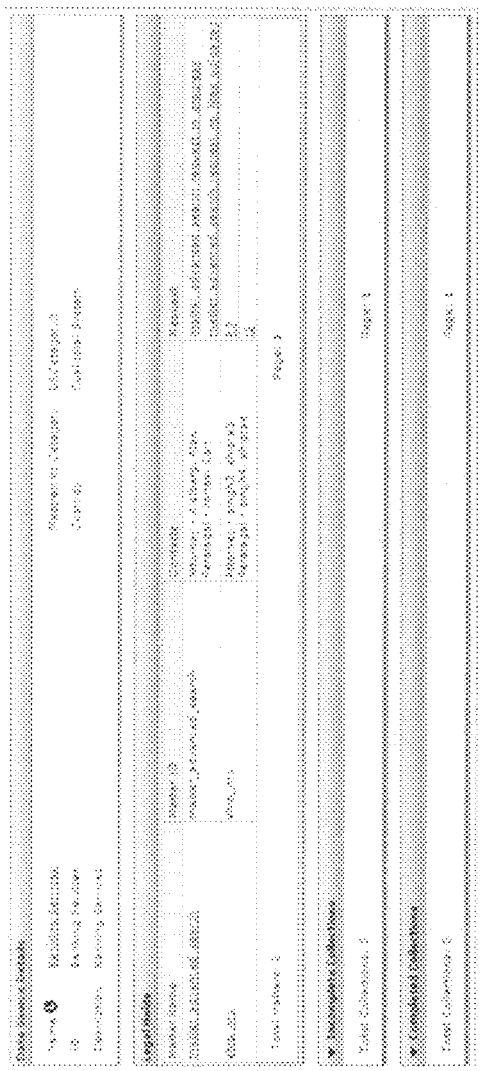

FIG. 8c illustrates an information portal display for legal holds according to an affected system (e.g., repository) an IT personnel is responsible for administering. The display may comprise a list of holds and pending collections for the affected system for which the user (e.g., IT personnel) is responsible. In this example, the affected system is the banking services system. Information regarding the holds may include an associated matter, matter identifier, contacts for the matter, and any requests.

Figure 8D:
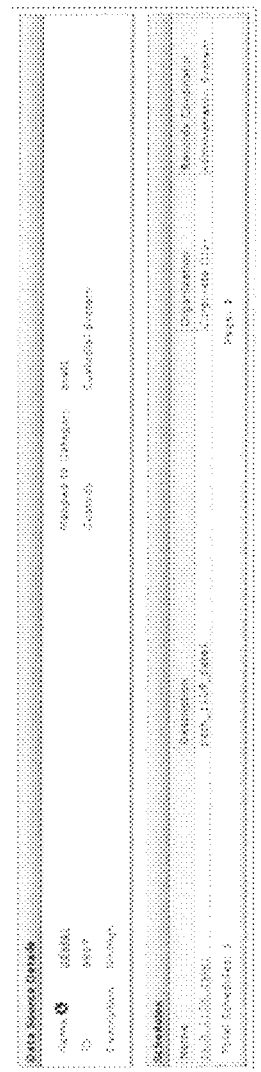

FIG. 8d illustrates an information portal display for retention schedules according to an affected system (e.g., repository) an IT personnel (i.e., current user/viewer) is responsible for administering. In this example, the affected system is the pdata1 system. Further information regarding a retention schedule may be obtained by selected a name or description of the retention schedule, for example.

The above-described functions and components can be comprised of instructions that are stored on a storage medium. The instructions can be retrieved and executed by a processor (e.g., the processor 704). Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method for managing legal obligations for data associated with a matter, comprising:
   determining, by at least one processor, at least one legal obligation with respect to the matter based at least in part on utilizing an enterprise map that comprises relationships between objects that represent data in an enterprise;
   generating, by the at least one processor, a workflow for performing the at least one legal obligation, the workflow providing instructions to personnel responsible for data management of one or more affected systems containing the data associated with the matter, the instructions being provided in a context of actions to be performed on the one or more affected systems;
   performing, by a conflicts module executing on the at least one processor a conflicts check of legal obligations across all matters to determine one or more conflicts in legal obligations for the personnel;
   in response to receiving, by the at least one processor, a criteria that specifies at least one of: an affected system of interest and a matter of interest:
      determining, by a cross-check module executing on the at least one processor, matters associated with the criteria and
      performing, by the cross-check module executing on the at least one processor, a cross-check of correlations between legal obligations across the matters associated with the criteria to determine an overlap between a first legal obligation and a second legal obligation for the personnel for a matter in the matters associated with the criteria;
   providing, by a portal module executing on the at least one processor, the instructions to the personnel via an information portal which provides a visual interface that displays in a single location all legal obligations to be performed by the personnel including the at least one legal obligation, all workflows for the personnel including the workflow, an indication of the one or more conflicts in legal obligations for the personnel, an indication of the overlap between a first legal obligation and a second legal obligation for the personnel for the matter and one or more retention schedules for the one or more affected systems in a single location for the personnel, wherein the indication of the overlap between the first legal obligation and a second legal obligation for the personnel for the matter includes an indication that the first legal obligation remains in effect for the personnel for the matter after removal of the second legal obligation; and
   providing, by the information portal executing on the at least one processor, an ability for the personnel to reroute conflicted legal obligations indicated by the information portal for review.

2. The method of claim 1 wherein determining the at least one legal obligation comprises determining, by the at least one processor, the personnel responsible for data management.

3. The method of claim 1 wherein determining the at least one legal obligation comprises determining, by the at least one processor, the one or more affected systems.

4. The method of claim 1 wherein determining the at least one legal obligation comprises determining, by the at least one processor, affected entities for the matter, the affected entities possessing the data associated with the legal matter.

5. The method of claim 1 wherein the generating workflow comprises generating, by the at least one processor, preservation instructions for the personnel responsible for data management in terms of the affected systems managed by the personnel.

6. The method of claim 1 wherein generating the workflow comprises generating, by the at least one processor, collection instructions for the personnel responsible for data management in terms of the affected systems managed by the personnel.

7. The method of claim 1 wherein generating the workflow comprises generating, by the at least one processor, retention instructions based on retention policies for the personnel responsible for data management in terms of the affected systems managed by the personnel.

8. The method of claim 1 wherein generating the workflow comprises generating, by the at least one processor, disposal instructions for the personnel responsible for data management in terms of the affected systems managed by the personnel.

9. The method of claim 1 wherein generating the workflow comprises generating, by the at least one processor, data handling and transportation instructions for the personnel responsible for data management in terms of the affected systems managed by the personnel.

10. The method of claim 1 wherein generating the workflow comprises generating, by the at least one processor, instructions associated with privacy laws for the personnel responsible for data management in terms of the affected systems managed by the personnel.

11. The method of claim 1 further comprising performing, by the at least one processor, a cross-check of legal obligations across all matters.

12. The method of claim 1 further comprising automatically resolving, by the conflicts module executing on the at least one processor, the one or more conflicts.

13. The method of claim 1 further comprising flagging, by the at least one processor, the one or more conflicts on the information portal.

14. The method of claim 1 further comprising performing, by the at least one processor, a compliance check to detect non-compliance of legal obligations to key attributes.

15. The method of claim 1 further comprising monitoring, by the at least one processor, the workflow for completion.

16. The method of claim 1 further comprising flagging, by the at least one processor, workflow that is due or overdue.

17. The method of claim 1 wherein providing the instructions comprises providing, by the at least one processor, explicit instructions in a different context then implicit instructions.

18. A system for managing legal obligations for data associated with a matter, comprising:
   at least one processor;
   a derivation module executing on the at least one processor and configured to determine at least one legal obligation with respect to the matter based at least in part on utilizing an enterprise map that comprises relationships between objects that represent data in an enterprise;
   a workflow module executing on the at least one processor and configured to generate a workflow for performing the at least one legal obligation, the workflow providing instructions to personnel responsible for data management of one or more affected systems containing the data stored on digital storage media, the instructions being provided in a context of actions to be performed on the one or more affected systems;
   a conflicts module executing on the at least one processor and configured to perform a conflicts check of legal obligations across all matters to determine one or more conflicts in legal obligations for the personnel;
   a cross-check module executing on the at least one processor and configured to, in response to receiving a criteria that specifies at least one of: an affected system of interest and a matter of interest:
      determine matters associated with the criteria and
      perform a cross-check of correlations between legal obligations across the matters associated with the criteria to determine an overlap between a first legal obligation and a second legal obligation for the personnel for a matter in the matters associated with the criteria; and
   a portal module executing on the at least one processor and configured to provide the instructions to the personnel via an information portal which provides a visual interface that displays in a single location all legal obligations to be performed by the personnel including the at least one legal obligation, all workflows for the personnel including the workflow, an indication of the one or more conflicts in legal obligations for the personnel, an indication of the overlap between a first legal obligation and a second legal obligation for the personnel for the matter, and one or more retention schedules for the one or more affected systems in a single location for the personnel, wherein the indication of the overlap between the first legal obligation and a second legal obligation for the personnel for the matter includes an indication that the first legal obligation remains in effect for the personnel for the matter after removal of the second legal obligation, and wherein the information portal further provides an ability for the personnel to reroute conflicted legal obligations indicated by the information portal for review.

19. The system of claim 18 further comprising a notification module executing on the at least one processor and configured to track completion of the workflow and provide notification accordingly.

20. The system of claim 18 further comprising a cross-check module executing on the at least one processor and configured to perform a cross-check of legal obligations across all matters.

21. The system of claim 18 further comprising a compliance module executing on the at least one processor and configured to detect non-compliance of legal obligations to key attributes.

22. A machine readable medium having embodied thereon a program, the program providing instructions for a method for managing legal obligations for data associated with a matter that is executed by at least one processor, the method comprising:
   determining at least one legal obligation with respect to the matter based at least in part on utilizing an enterprise map that comprises relationships between objects that represent data in an enterprise;
   generating workflow for performing the at least one legal obligation the workflow providing instructions to personnel responsible for data management of one or more affected systems containing the data, the instructions being provided in a context of actions to be performed on the one or more system;
   performing, by a conflicts module a conflicts check of legal obligations across all matters to determine one or more conflicts in legal obligations for the personnel;
   in response to receiving a criteria that specifies at least one of: an affected system of interest and a matter of interest:
      determining, by a cross-check module, matters associated with the criteria and
      performing, by the cross-check module, a cross-check of correlations between legal obligations across the matters associated with the criteria to determine an overlap between a first legal obligation and a second legal obligation for the personnel for a matter in the matters associated with the criteria;
   providing the instructions to the personnel via an information portal which provides a visual interface that displays in a single location all legal obligations to be performed by the personnel including the at least one legal obligation, all workflows for the personnel including the workflow, an indication of the one or more conflicts in legal obligations for the personnel, an indication of the overlap between a first legal obligation and a second legal obligation for the personnel for the matter, and one or more retention schedules for the one or more affected systems in a single location for the personnel, wherein the indication of the overlap between the first legal obligation and a second legal obligation for the personnel for the matter includes an indication that the first legal obligation remains in effect for the personnel for the matter after removal of the second legal obligation; and
   providing, by the information portal, an ability for the personnel to reroute conflicted legal obligations indicated by the information portal for review.

* * * * *